United States Patent
Pepper et al.

(10) Patent No.: US 9,536,223 B2
(45) Date of Patent: Jan. 3, 2017

(54) GATHERING, SELECTING AND GRAPHING N-GRAMS

(71) Applicant: TWITTER, INC., San Francisco, CA (US)

(72) Inventors: Noah Pepper, Portland, OR (US); Homer Strong, Portland, OR (US); Jesse Smith, Portland, OR (US); Daniel Lidral-Porter, Portland, OR (US); Devin Chalmers, Portland, OR (US)

(73) Assignee: Twitter, Inc., San Francisco, CA (US)

( * ) Notice: Subject to any disclaimer, the term of this patent is extended or adjusted under 35 U.S.C. 154(b) by 323 days.

(21) Appl. No.: 13/659,073

(22) Filed: Oct. 24, 2012

(65) Prior Publication Data

US 2014/0115527 A1   Apr. 24, 2014

(51) Int. Cl.
*G06F 17/30* (2006.01)
*G06Q 10/10* (2012.01)

(52) U.S. Cl.
CPC ........... *G06Q 10/10* (2013.01); *G06F 17/30* (2013.01); *G06F 17/30651* (2013.01); *G06F 17/30696* (2013.01); *G06F 17/30716* (2013.01)

(58) Field of Classification Search
None
See application file for complete search history.

(56) References Cited

U.S. PATENT DOCUMENTS

| 6,574,632 | B2 * | 6/2003 | Fox et al. | |
|---|---|---|---|---|
| 8,463,789 | B1 * | 6/2013 | Joshi et al. | 707/738 |
| 2007/0219983 | A1 * | 9/2007 | Fish | 707/5 |

OTHER PUBLICATIONS

"Google books Ngram Viewer". Google [online], [retrieved on Oct. 15, 2014]. Retrieved from the Internet (URL: https://web.archive.org/web/20110928123540/http://books.google.com/ngrams), Sep. 28, 2011.*

Orwant, Jon. "Ngram Viewer 2.0". Google Research Blog [online], [retrieved on Oct. 16, 2014]. Retrieved from the Internet (URL: http://googleresearch.blogspot.com/2012/10/ngram-viewer-20.html), Oct. 18, 2012.*

(Continued)

*Primary Examiner* — Matt Kim
*Assistant Examiner* — Daniel Samwel
(74) *Attorney, Agent, or Firm* — Fish & Richardson P.C.

(57) ABSTRACT

A user can designate a dataset and one or more n-grams in a graphical user interface displayed by a client computing device ("the client"). The client can send the designations to a server computing device ("the server"). The server can execute a query over the dataset based on the n-grams, and return statistics indicating occurrences of the n-grams in the dataset. The client can generate a graphical representation corresponding to the statistics. The user can select a portion of the graphical representation, which the client sends to the server. The server can respond with excerpts of documents corresponding to the selected portion and other n-grams within the documents. The client can then display a list of the excerpts and a list of other n-grams. The user can then perform further actions on the lists such as viewing the underlying documents or adding n-grams to the search query.

20 Claims, 20 Drawing Sheets

(56) References Cited

OTHER PUBLICATIONS

Davis, Mark. "The 385+ million word Corpus of Contemporary American English (1990-2008+) Design, architecture, and linguistic insights". International Journal of Corpus Linguistics 14:2 [online], retrieved [Oct. 17, 2014]. Retrieved from the Internet (URL: http://davies-linguistics.byu.edu/ling485/for_class/davies_ijcl.pdf), 2009.*

Kim, Su Nam; Baldwin, Timothy; Kan, Min-Yen. "Evaluating N-gram based Evaluation Metrics for Automatic Keyphrase Extraction". Proceedings of the 23rd International Conference on Computational Linguistics [online], [retrieved on Oct. 17, 2014]. Retrieved from the Internet (URL: http://dl.acm.org/citation.cfm?id=1873846), Aug. 2010.*

* cited by examiner

GATHERING, SELECTING AND GRAPHING N-GRAMS

BACKGROUND

The amount of digitally available data is growing at an ever increasing rate. Every time someone posts a tweet, sends an email, drafts a memo, updates a stock quote, or publishes a news article, they are creating a new digital document. Current approaches to the organization and analysis of this overwhelming body of documents can involve anything from the use of a conventional search engine, to advanced applications for visualization of the frequency of words and phrases across a set of documents.

In many cases this kind of analysis can require that a researcher manually extract and collate information from the identified information sources. Tools are available to help researchers identify subsets within their data, but these often require advanced knowledge of programming or database query languages. Researchers are often relegated to reading through many individual documents to gain an understanding about trends and sentiment groupings. This can be a very time-consuming process.

Moreover, even with a significant investment of time, a researcher can be left with an incomplete picture of inter-relations. While conventional search engines can quickly retrieve documents for a topic defined by a researcher, and data collation programs can collate representations once a researcher has created well-defined queries, these techniques generally require researchers to know exactly what they are looking for and specify relevant search and analysis parameters.

DETAILED DESCRIPTION

Figure 1:
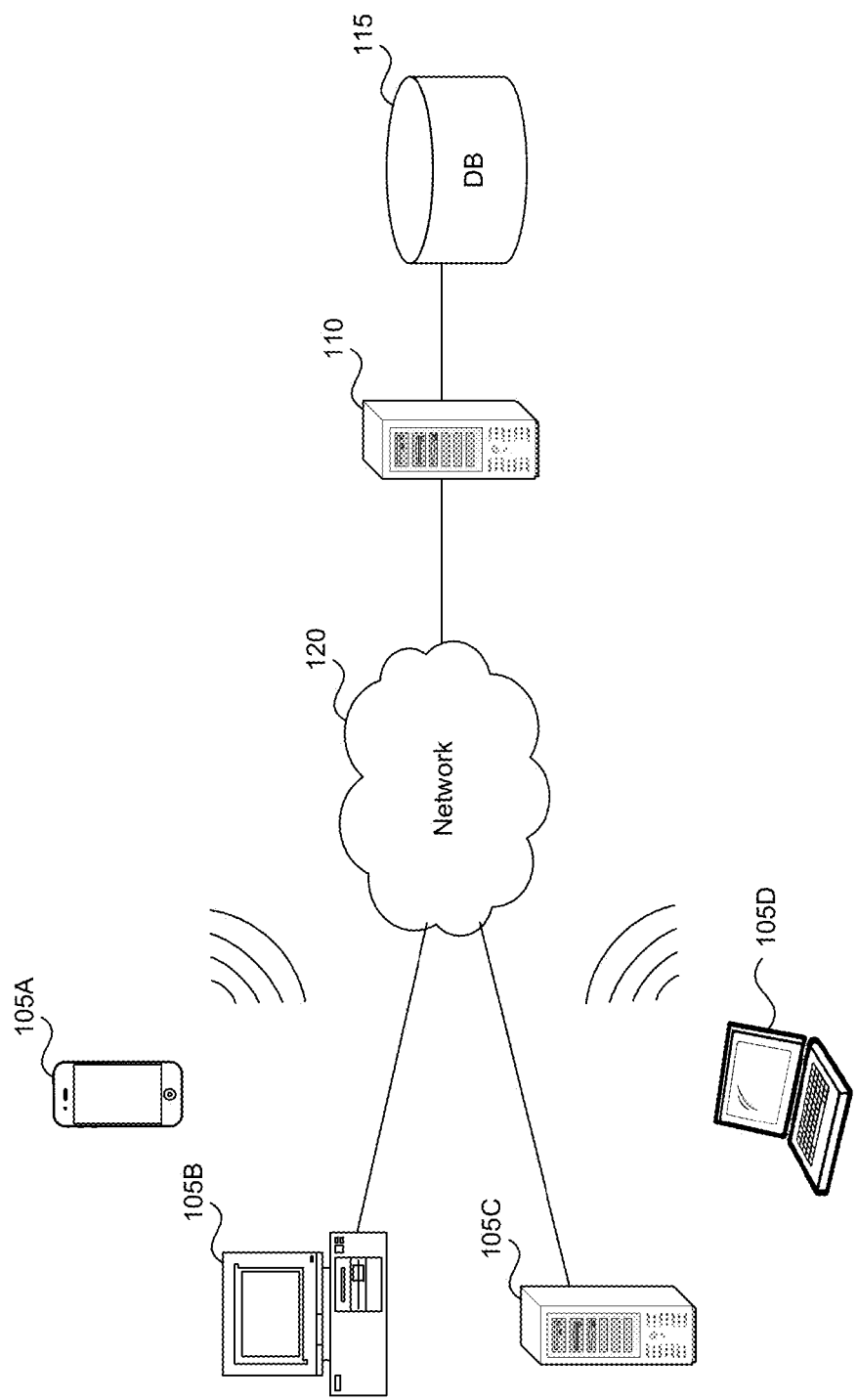
FIG. 1 is a block diagram illustrating an overview of an environment and devices on which some embodiments of the current application may operate.

Technology for gathering and displaying information is disclosed ("the technology"). In some embodiments, a user interface operating at a client computing device communicates with a server computing device. Using the user interface, a user selects a dataset, comprising data elements called documents, that the user wishes to analyze. A document is a container for various types of data. A document may store contents of a conventional document, e.g., a memo or email, shorter snippets of text, e.g., tweets or blog posts, or other sets of numerical or relational data, e.g., groups of stock quotes or weather reports. The client computing device sends the dataset selection to the server computing device. The user also enters one or more n-grams into a query builder panel of the user interface. An n-gram comprises one or more discrete words, wherein a word is a collection of characters. In some embodiments, n-grams can be limited to a maximum number of words, e.g., four words. After the user enters one or more n-grams, the client computing device sends the n-gram is sent to the server computing device, either with the dataset selection, or as a separate transmission. The server computing device executes a query over the dataset based on the received n-grams, and returns a set of statistics indicating occurrences of the n-grams in the dataset documents.

The client computing device generates a graphical representation of the statistics received from the server computing device and displays the graphical representation in a workspace panel of a user interface, which is displayed concurrently with the query builder panel. The graphical representation may comprise one or more distinct sets of lines or curves. The individual sets of lines or curves form a graph. The user can select a portion of the displayed graphical representation, e.g., by clicking and dragging a mouse across a displayed portion of the graphical representation. The client computing device can then send an indication of the selected portion to the server computing device. The server computing device can compile and respond with snippets, which can be either summaries or excerpts of selected documents; links to the documents; and/or statistics on occurrences of other n-grams within the selected documents.

The client computing device can display a subset of the snippets it received from the server computing device in a document inspector panel. The document inspector panel can be displayed concurrently with the query builder panel and the workspace panel. The client computing device can also display a list of related n-grams in a related phrases panel, organized according to the number of times the related n-grams occur within a certain distance of a query n-gram in the documents returned from the server computing device. The user may select a snippet from the document inspector panel, and in response, the client computing device can display the full text of the document. If the server computing device did not return all documents from the portion of the dataset corresponding to the selected portion of the graphical representation, the user may enter a command to retrieve more documents from the server computing device and update the document inspector panel or related phrases panel.

In some embodiments, the user interface enables a user to select elements from the list of related n-grams generated by the server computing device. The selected elements can be added to the n-grams entered in the query builder panel, which restarts the process for constructing the graphical representation, thereby enabling further selection of a portion of the graphical representation, and display of related documents and n-grams.

While several operations are described herein as occurring either at the client computing device or server computing device, it is well known in the art that many such processes can be performed at either device. For example, in embodiments discussed above, the server computing device returns statistics on occurrences of the n-grams and the client computing device generates a graphical representation for display in the workspace. However, in an alternate embodiment, the server computing device could generate the graphical representation and transmit the graphical representation to the client computing device to display in the workspace panel. As another example, in response to the initial dataset and n-gram transmission, the server computing device could return a set of documents matching the dataset and n-grams, and the client computing device could perform further calculations on the dataset, e.g., generating a graphical representation, determining documents within a selected portion of the graphical representation, generating document snippets and related n-gram frequency, etc.

FIG. 1 is a block diagram illustrating an overview of an environment and devices on which some embodiments of the current application may operate. A system for implementing the technology may include one or more client computing devices 105A-D. Components of each client computing device 105A-D may include, but are not limited to, a processing unit, a system memory, a storage unit, a network interface or adapter, a display, and an input device. One or more client computing devices 105A-D may be referred to herein as client computing device 105.

The client computing device 105 typically includes a variety of computer-readable storage media, e.g., a magnetic storage device, flash drive, RAM, ROM, tape drive, disk, CD or DVD. Computer-readable media can be any available storage media and include both volatile and nonvolatile media and removable and non-removable media.

Client computing device 105 may operate in a networked environment using logical connections to one or more remote computers such as server computing device 110 through network 120. Network 120 can be a local area network (LAN) or a wide area network (WAN), but may also be other wired or wireless networks. The client computing devices 105 can be connected to network 120 through a network interface, such as by a wired or wireless network.

The technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, tablet devices, multiprocessor systems, microprocessor-based systems, set-top boxes, programmable consumer electronics, network PCs, minicomputers, mainframe computers, distributed computing environments that include any of the above systems or devices, and the like.

Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection.

Figure 2:
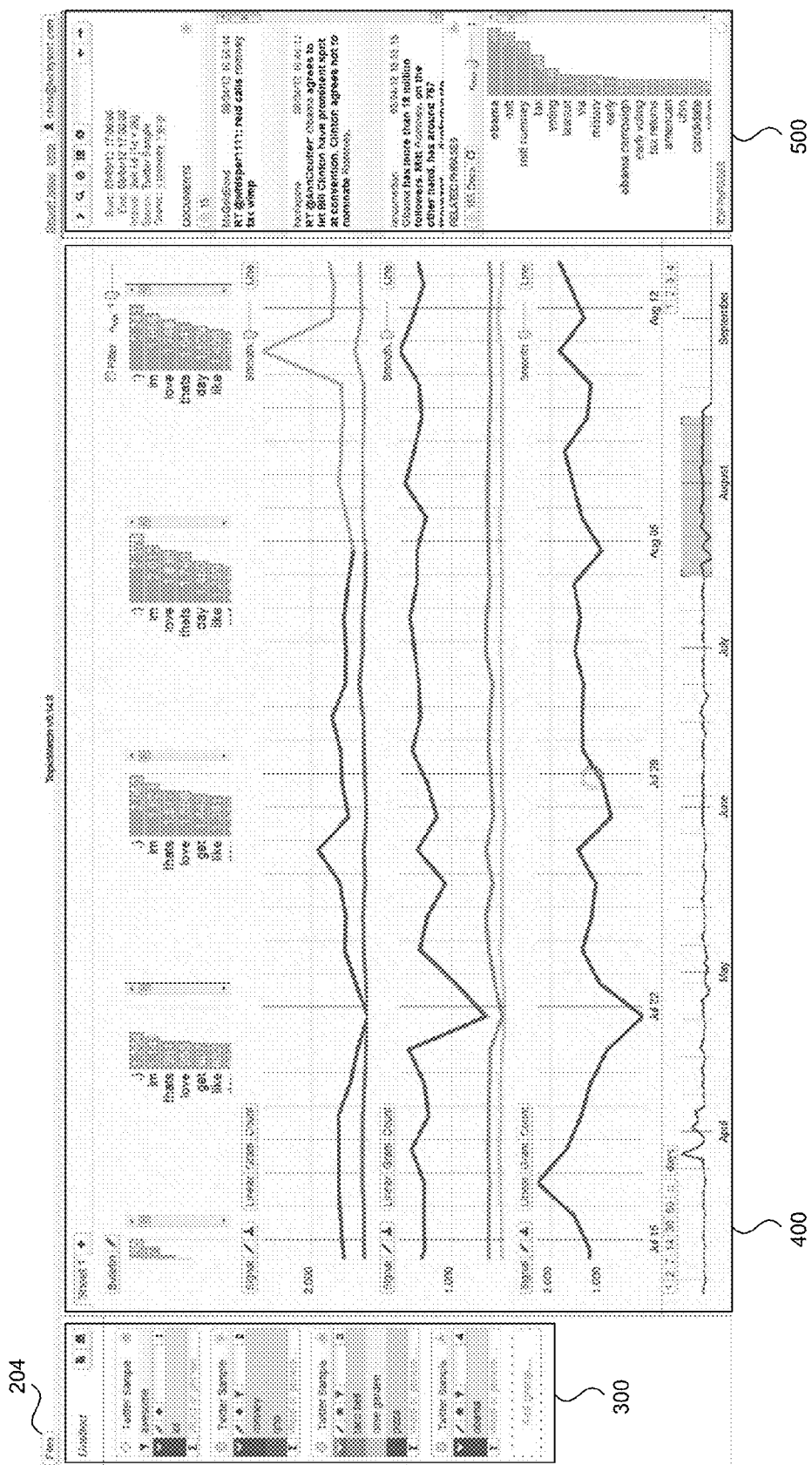
FIG. 2 is a chart diagram illustrating a graphical user interface displayed at a client computing device.

FIG. 2 is a chart diagram illustrating a graphical user interface displayed at a client computing device. A user may enter a designation of a dataset and one or more topic n-grams into query builder panel 300, discussed in more detail below in reference to FIG. 3. Client computing device 105 can send the dataset and topic n-gram designations to server computing device 110. Server computing device 110 may determine and return a set of statistics for the occurrences of the topic n-grams in the dataset, this server process is discussed in more detail below in reference to FIG. 8A. Client computing device 105 may then calculate a graphical representation of the statistics and display the graphical representation in workspace 400, discussed in more detail below in reference to FIG. 4. A user can select a portion of the graphical representation displayed in workspace 400. Client computing device 105 may send an indication of the portion of the graphical representation selected to server computing device 110. In some embodiments, the indication includes an identifier of one of the graphs making up the graphical representation and an interval.

Server computing device 110 may determine the portion of the dataset matching the selected portion of the graphical representation, called the data subset, and respond with a set of snippet/link pairs and a set of related n-grams/statistic pairs selected from the data subset, this server process is discussed in more detail below in reference to FIG. 8B. Client computing device 105 can organize the snippets into a list for display in a document inspector sub-panel 536 of inspector panel 500, discussed in more detail below in reference to FIG. 5B. Client computing device 105 also may create a list of unique related n-grams, organized in decreasing order by the number of times each unique related n-gram appears in a set of related n-grams within a pre-defined distance of the query n-grams, and display the ordered list of unique related n-grams with an indicator of the occurrence in related phrases sub-panel 566 of inspector panel 500, discussed in more discussed in more detail below in reference to FIG. 5C.

In the examples herein, client computing device 105 and server computing device 110 are used as examples of devices that may perform the described process. However, it will be understood by persons skilled in that art that there are many other devices which can perform the described tasks of client computing device 105 and/or server computing device 110.

FIG. 2 also illustrates a files button 204, which opens library 600, discussed in more discussed in more detail below in reference to FIG. 6.

Figure 3A:
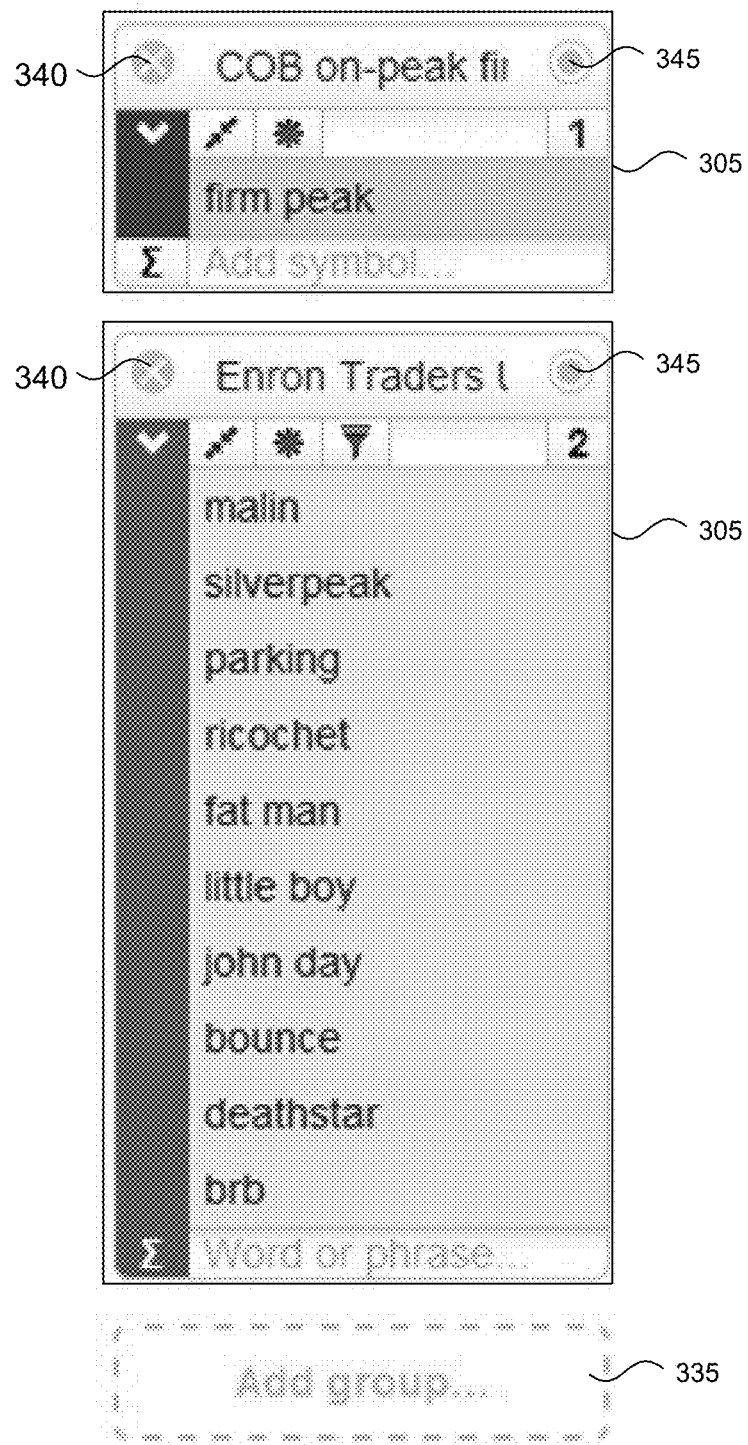
FIGS. 3A-C are user interface diagrams illustrating elements of the query builder panel of a graphical user interface.

FIG. 3A is a user interface diagram illustrating elements of the query builder panel of a graphical user interface. Queries can be organized into a number of topics 305. A user can add a new topic by engaging add topic button 335. A user can delete a topic by engaging a delete topic button 340. An active topic can be temporarily toggled between active and inactive by engaging a toggle topic button 345 corresponding to the inactive or active topic.

Figure 3B:
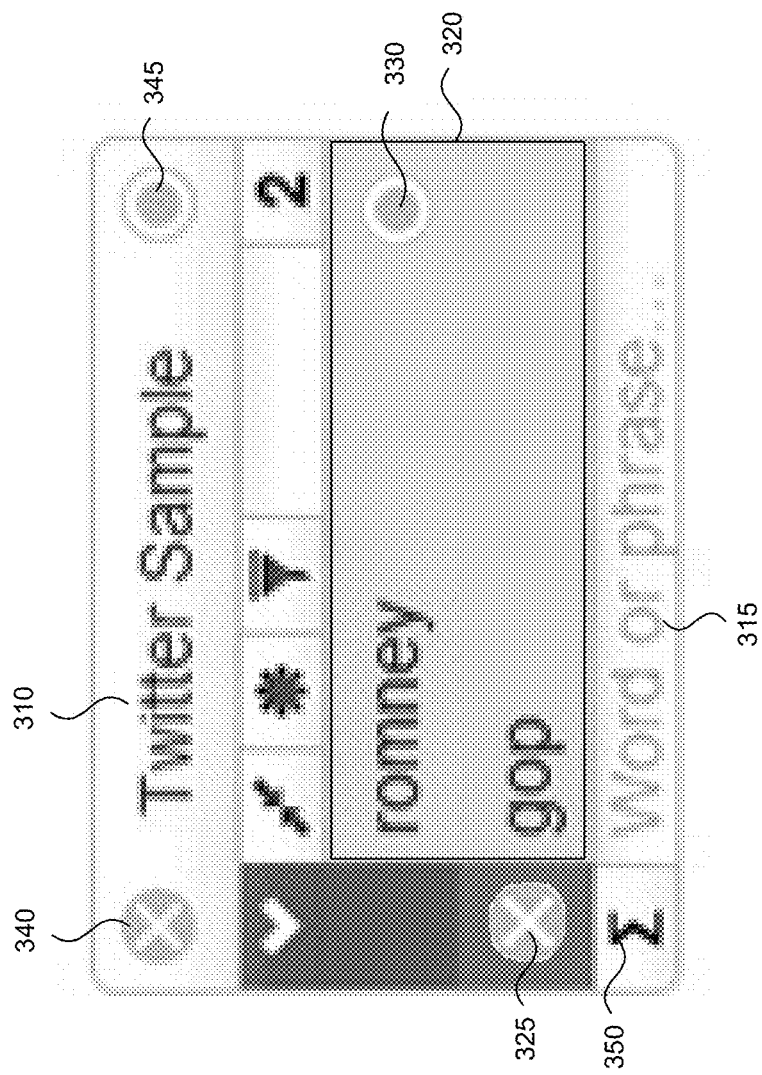

FIG. 3B is a user interface diagram illustrating an individual topic from the query builder panel of a graphical user interface. Each topic 305 can identify a separate dataset 310. For example, a user can select a dataset from a drop down list of datasets available to the particular user on the server computing device configured to receive the query. Each topic 305 can also have an input field 315 for adding query n-grams. A user can add n-grams to the query n-grams 320 by typing a symbol, word, or phrase into input field 315. In some embodiments, an auto-complete menu provides a list of n-grams that have occurred recently in the selected dataset 310 as a user types the beginning of an n-gram in input field 315.

An n-gram can be removed from the query n-grams 320 by engaging a delete n-gram button 325 corresponding to a particular n-gram. An active n-gram can be temporarily toggled between active and inactive within the query n-grams 320 by engaging toggle n-gram button 330 corresponding to the active or inactive n-gram.

Figure 3C:
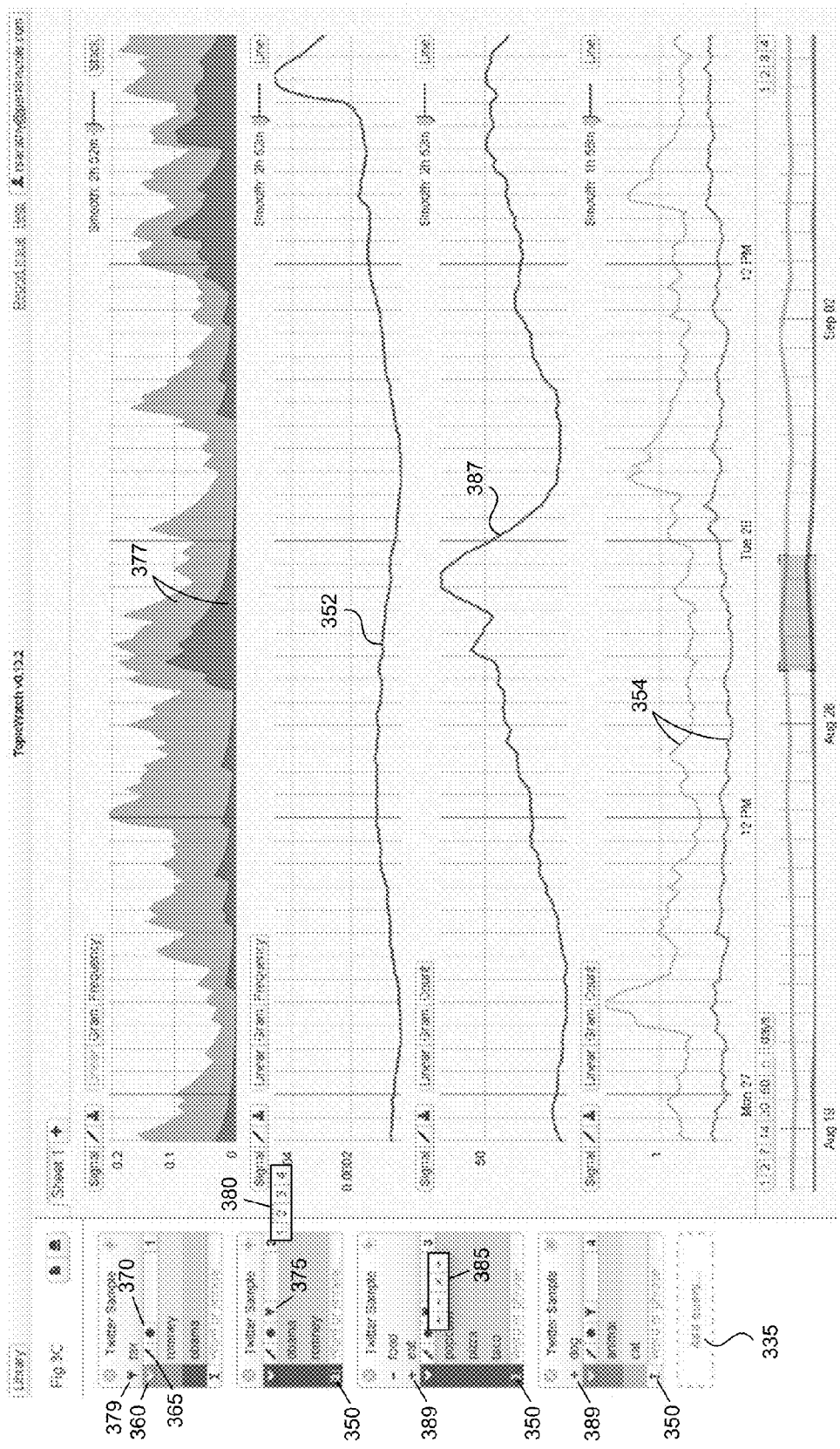

FIG. 3C is a user interface diagram illustrating an individual topic implementing options from the query toolbar and summary toggle in a graphical user interface. The query n-grams 320 may be combined in a number of ways by engaging a summary toggle region 350. In some embodiments, selecting the summary toggle region 350 cycles to the next of the available settings each time it is engaged. The settings for the summary toggle may include sum, average, or individual. When the summary toggle is set to "sum," the statistics retrieved from server computing device 110 for each of query n-grams 320 can be added together to create a particular graph 387. For example, the individual values at point x=1 are {popcorn=3; pizza=4; taco=2}, the resulting graph would have a single value for point x=1 with the sum y=9. Similarly, when the summary toggle is set to "average," the statistics retrieved from server computing device 110 for each of query n-grams 320 can be averaged to create a particular graph 354. For example, with the same individual values at point x=1: {popcorn=3; pizza=4; taco=2}, the resulting graph would have a single value for point x=1 with the average y=3. When the summary toggle is set to "individual," the statistics retrieved from server computing device 110 for each of the query n-grams 320 are displayed in separate graphs 352. For example, the individual values at each point would each be displayed as part of a separate graph such as at x=1, y={popcorn=3; pizza=4; taco=2}.

Each graph can have a separate color scheme, which can be chosen by a user by engaging color selector 360. The query n-grams 320 may be compacted into a genome by engaging genome compact button 365, genomes are discussed in more detail below in reference to FIG. 6.

Operations may be applied to query n-grams 320 within a topic 305 by engaging one of the operations in operations toolbar 385, accessed by engaging a corresponding operations button such as operations button 370, and entering a corresponding operation n-gram 389. Operations toolbar 385 may include any mathematical or logical operation. In some embodiments, operations toolbar 385 includes the operations add, subtract, multiply, and divide. When an operation is applied to a topic 305, the statistics retrieved from server computing device 110 for each of query n-grams 320 can be modified by the statistics for the operation n-gram 389 before rendering the graphical representation. For example, if the query n-grams 320 have values at point x=1 of {animal=6; cat=8}, the operation engaged in operations toolbar 385 is divide ("÷"), and the operation n-gram 389 has the value at point x=1 of {dog=2}, the resulting graph (assuming the summary toggle is set to individual) would have two values for point x=1 y={animal(6)÷dog(2)=3; cat(8)÷dog(2)=4}. Some embodiments enable a user to engage multiple operations from operations toolbar 385 for a single topic 305. Operations would follow standard mathematical operator precedence. In various embodiments, a user may toggle operations between active and inactive states.

The dataset 310 for a particular topic 305 may be filtered by engaging co-occurrence filter button 375. Limiting a dataset 310 by a co-occurrence effectively returns statistics for query n-grams 320 to documents where the query n-gram occurs with the filter n-gram 379. A filter dataset may be pre-calculated in the database to improve server response time to queries using a filter. When a query includes a filter n-gram 379, the server may determine if the filter already exists for this dataset. If so, the query executes as described below. If the filter does not exist it may be created before the query executes. Co-occurrence filter creation is discussed in more detail below in relation to FIG. 10. Graphs 377 are displayed with the query n-grams "romney" and "obama" filtered based on filter n-gram "tax" 379.

Unless a topic is toggled inactive, the graphs related to that particular topic may be displayed in one or more views by designating one or more views in view selector 380. Views are discussed in more detail immediately below in relation to FIGS. 4A-4C.

Figure 4A:
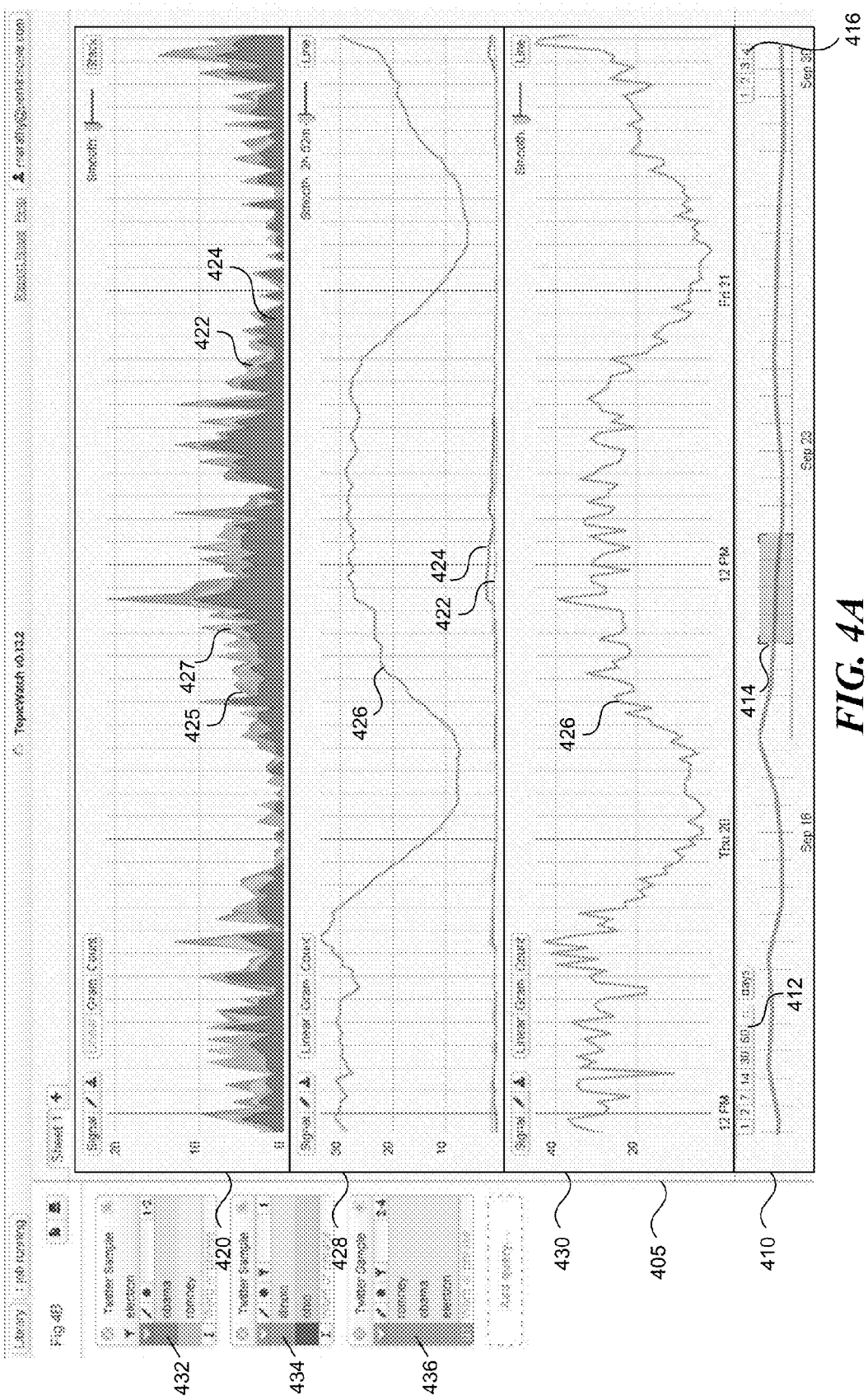
FIGS. 4A-C are user interface diagrams illustrating the workspace panel of a graphical user interface.

FIG. 4A is a user interface diagram illustrating the workspace panel of a graphical user interface. After receiving a set of statistics from server computing device 110, client computing device 105 may render a graphical representation of the statistics in workspace panel 400. Workspace panel 400 has a set of views 405 and a navigator panel 410. A view can be created for each of the set of view selectors designated by the active topics 305. For example, in FIG. 4A, there are three topics, where the first topic 432 has selected views 1 and 2, the second topic 434 has selected view 1, the third topic 436 has selected views 2 and 4. The set of views are {1, 2, 4} so three views 420, 428, and 430 are created in workspace panel 400. View 420 includes graphs 422 "obama" and 424 "romney," from topic 432 and graphs 425 "illinois" and 427 "ohio," from topic 434. View 428 includes graphs 422 "obama" and 424 "romney," from topic 432 and graph 426 the average of "romney," "obama," and "election," from topic 436. View 430 includes graph 426 from topic 436.

FIG. 4A includes navigator panel 410. Navigator panel 410 illustrates a version of one of the set of views 405, selected with view selector 416. Within navigator panel 410 there is window slider 414. Window slider 414 corresponds to the section along the x-axis displayed in the set of views 405. The interval and granularity for the x-axis of views 405 can be determined by interval selector 412. For example, if the x-axis represents time, the available intervals may be "hours," "days," and "weeks," and the granularity for hours, for example, could be "1," "2," "4," "8," "12," and "24." Some embodiments enable the user to specify a different granularity from the preset granularities.

Figure 4B:
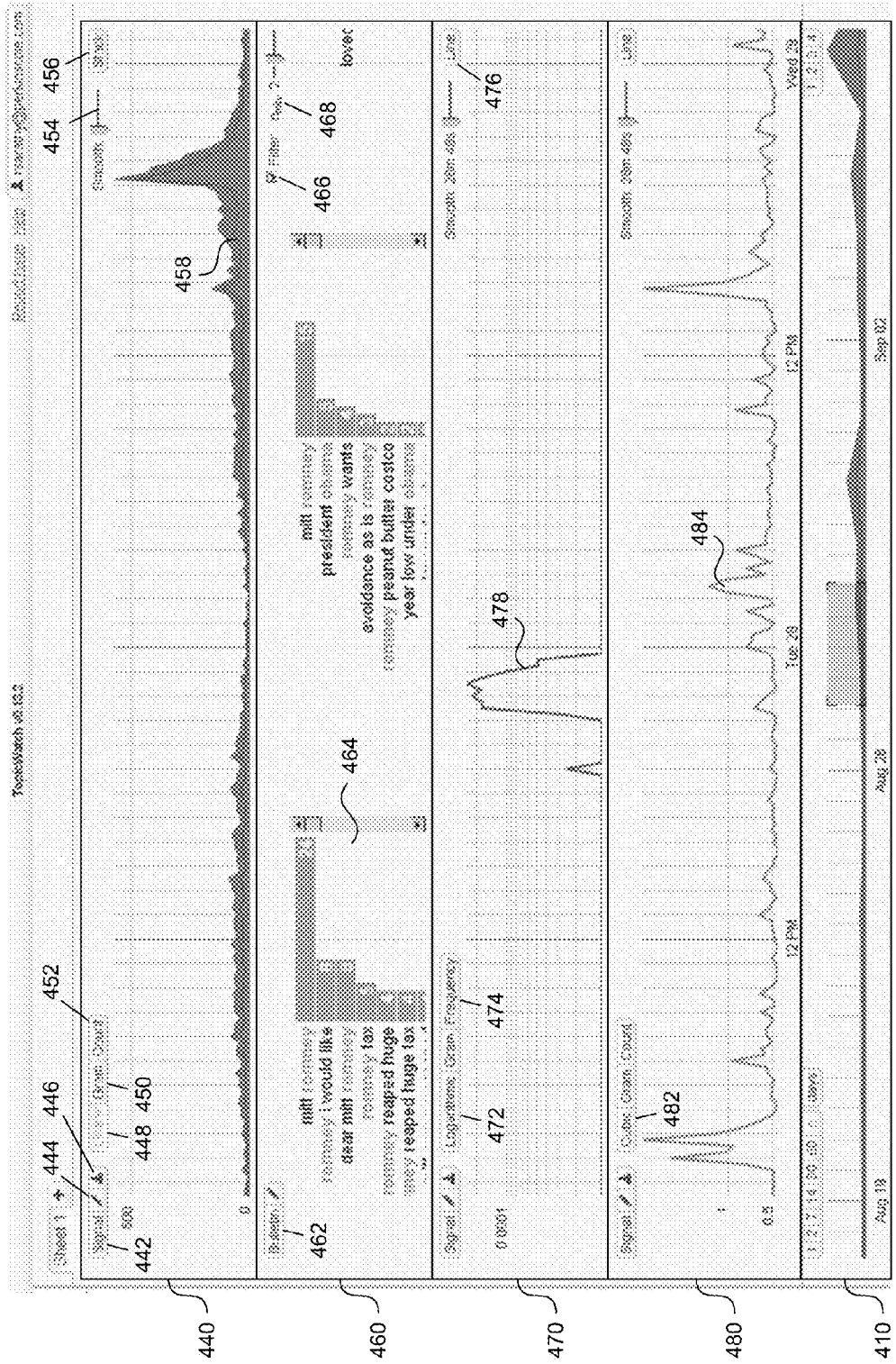

FIG. 4B is a user interface diagram illustrating the workspace panel of a graphical user interface implementing views with various graph options. Each view may have a number of controls to customize the display of the graphs within that view. View 440 has a graph type selector 442 which enables a user to select from a number of graph types. In some embodiments, the graph types include "Signal," "Bulletin," "Punchcard," "Dot," "Bubble," "Scatter," "Heatmap," "Network," "Physical Map," "Geo-location," "Tree map," "Chord diagram," "Calendar," "Force directed," "Slope," "Sun Burst," "Horizon," "Word Count," "Document Count," "Pie," "Bar," "Bullseye," "Rradar," "Candlestick," "Box Plot," and other graph types known in the art. Graph type selector 442, set to "Signal," controls graph 458 to display as a signal graph. Graph type selector 462, set to "Bulletin," controls graph 464 to display as a bulletin graph. A bulletin graph summarizes different intervals into gram lists or "bulletins." Each bulletin comprises a list of n-grams for the identified interval, each list sorted by the number of occurrences of the n-gram within the interval. Each item in the list of n-grams may have indicator for number of occurrences of the n-gram within the interval. Graph type selector 492 in FIG. 4C, set to "Punchcard," controls graph 490 to display as a punchcard graph. A punchcard graph displays a grid of discrete value indicators with a major scale along the one axis and a minor scale along the other, with each indictor in the grid matching the occurrence value at the designated scale intersection. For example, graph 490 has a major scale of days (Sunday-Saturday) along the y-axis, and hours within a day (12 AM-12 PM) on the x-axis. For each day within the week, the hourly occurrence of the query n-grams is displayed at the designated intersection for that hour on that day.

Figure 4C:
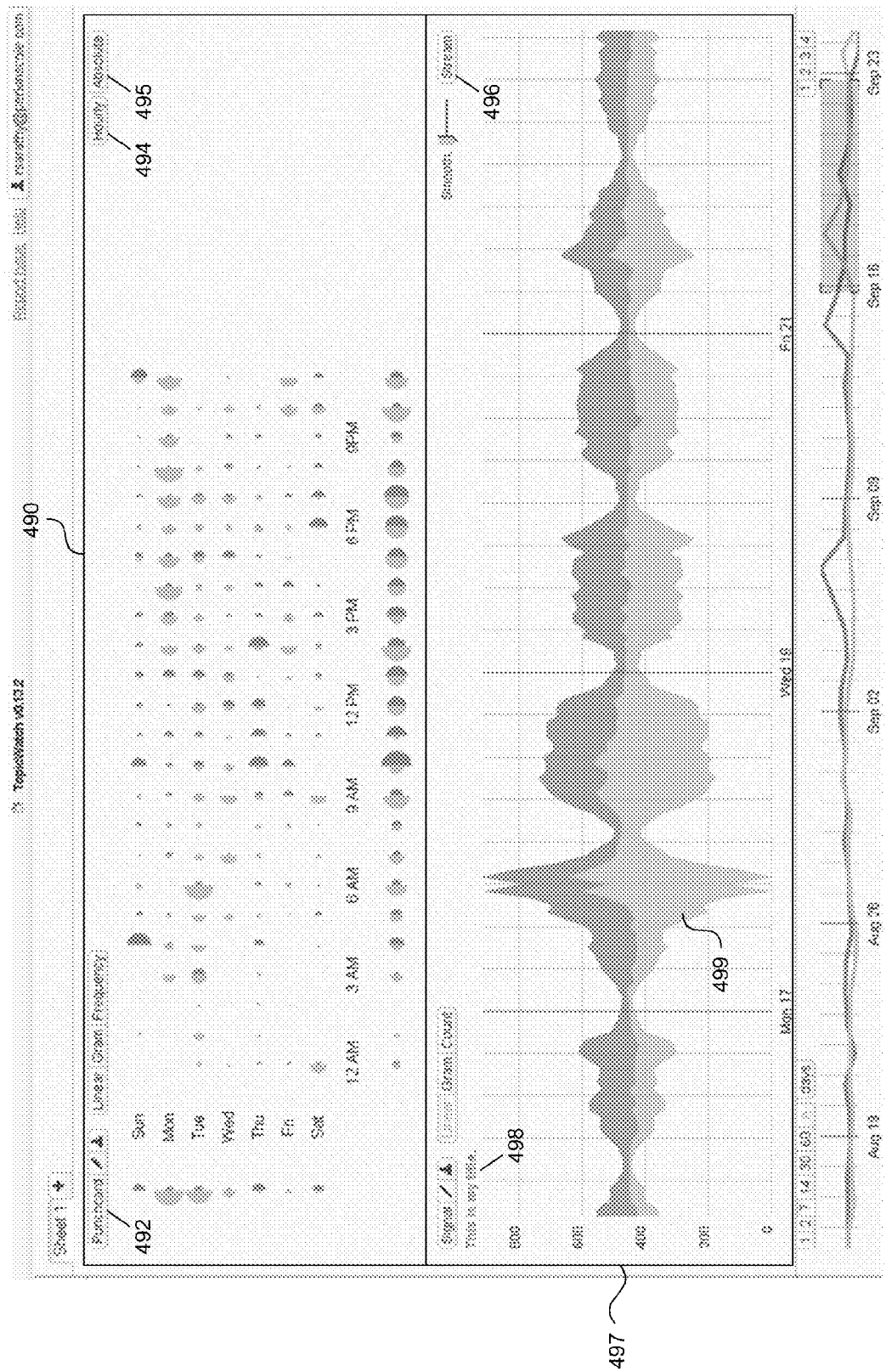

Engaging title edit button 444 enables a user to add a title to a view, e.g., title 498 in FIG. 4C. In various embodiments a user edits a view title by re-engaging the title edit button, or by double-clicking an existing title. Engaging export button 446 saves the contents of a view to the user's computer as an image, sets of markup elements, or in other formats.

Some graph types can support multiple scales, which can be selected with scale select button 448. In various embodiments one or more graphs support linear, cubic, logarithmic, square root, exponential, or other scales. Scale select button 448, set to "Linear," controls graph 458, and the corresponding scale in view 440, to display on a linear scale. Scale select button 472, set to "Logarithmic," controls graph 478, and the corresponding scale in view 470, to display on a logarithmic scale. Scale select button 482, set to "Cubic," controls graph 484, and the corresponding scale in view 480, to display on a cubic scale.

Some datasets may be conceptualized in multiple metrics. For example, a numeric source containing stock symbols might enable a user to switch between price, change in price, volume, or other metrics. Engaging the metric selector enables a user to pick a metric available for the selected dataset. Metric selector 450, set to "Gram," controls graph 458 to display on a per-occurrence metric.

Some datasets may also be conceptualized as an absolute count within the dataset at each point, or as a function of frequency, which is the count of n-grams at each point divided by the number of documents at that point in which the n-gram occurs. Frequency toggle 452, set to "Count," controls graph 458 to display as an absolute count of occurrences in the dataset. Frequency toggle 474, set to "Frequency," controls graph 478 to display as a function of occurrences/documents in the dataset.

In view 440, graph type selector 442 is set to signal. Signal graphs can be further customized. A smoothing function may be applied to a signal graph to moderate noise or outlying points to better capture important patterns. By smoothing a graph, the data points of a signal are modified so points that are lower than the adjacent points may be increased and points higher than adjacent points may be lowered, leading to a smoother signal. A smoothing slider 454 can be drug to indicate the amount of smoothing desired by a user. The length of the smoothing interval can be displayed next to the slider. In some embodiments the length of the smoothing interval from the smoothing slider is used to transform the signal into an exponential moving average.

Another way in which signal graphs can be customized is in the type of signal. Engaging signal type buttons 456 and 476 enable a user to select between a standard line view and various stack layouts which illuminate an area below the signal. Various embodiments of stack graphs include a general "Stack," an "Area," an "Overlapping Area," a "Stream," and a "Baseline Stream."

A stack graph stacks the value of one graph on top of another by using the lower graph in the stack as the baseline for the graph above it. The area between the signal line and the line below it in the stack is then highlighted. For example, a stack graph at a point with two graphs, graph "Ohio" stacked on top of graph "Virginia," with values y={Virginia=4, Ohio=2}, would have a point for graph Virginia at y=4, with the area between this point and the x-axis highlighted, and also a point for graph Ohio at y=6, with the two area units between it and the Virginia graph highlighted. An area graph normalizes values of the stack graph to display percents of the total for a given point. A stream graph shifts the baseline of the stack graph at each point along the x-axis, making it easier to perceive the thickness of any given layer across the data. For each point along the stream graph, the baseline is shifted so an equal area exists above and below the x-axis. For example, in a stream graph of the previous Ohio, Virginia example the baseline is shifted so half the sum of the two values, 3, is each above and below the x-axis. In this case 3 Virginia units would be below the baseline, one Virginia unit would be above the baseline, and two Ohio units would be stacked on top of the Virginia units above the baseline. Signal type button 456, set to "Stack," controls graph 458 to display as a stack. Signal type button 496 in FIG. 4C, set to "Stream," controls graph 499 in view 497 to display as a stream.

In view 460, graph type selector 462 is set to Bulletin. Bulletin graphs can also be further customized. By engaging filter button 466, the lists of n-grams matching the filter are further refined to only include n-grams that include one or more of the query n-grams. For example, in view 460, filter button 466 is engaged, so each list of n-grams is restricted to n-grams that contain the query n-grams "obama" or "romney."

The n-grams in the bulletin graph lists can be further limited to a minimum number of words by engaging the nMin slider. For example, nMin slider 468 is set to 2, so each n-gram in graph 464 comprises at least two words.

In view 492 of FIG. 4C, graph type selector 492 is set to "Punchcard." In some embodiments the type and scale of punchcard graphs can be customized. By engaging punch type button 494, an interval for the x-axis within the punchcard graph can be selected. For example, by selecting "Hourly" in graph type selector 494, view 490 summarizes a full week of data into hours of the day. In various embodiments, the punchcard graph is formatted to either an absolute scale across all punches, or a relative scale within each punch. Graph type selector 495 set to "Absolute" controls the punchcard graph in view 490 to use an absolute scale to display punch data.

Figure 5A:
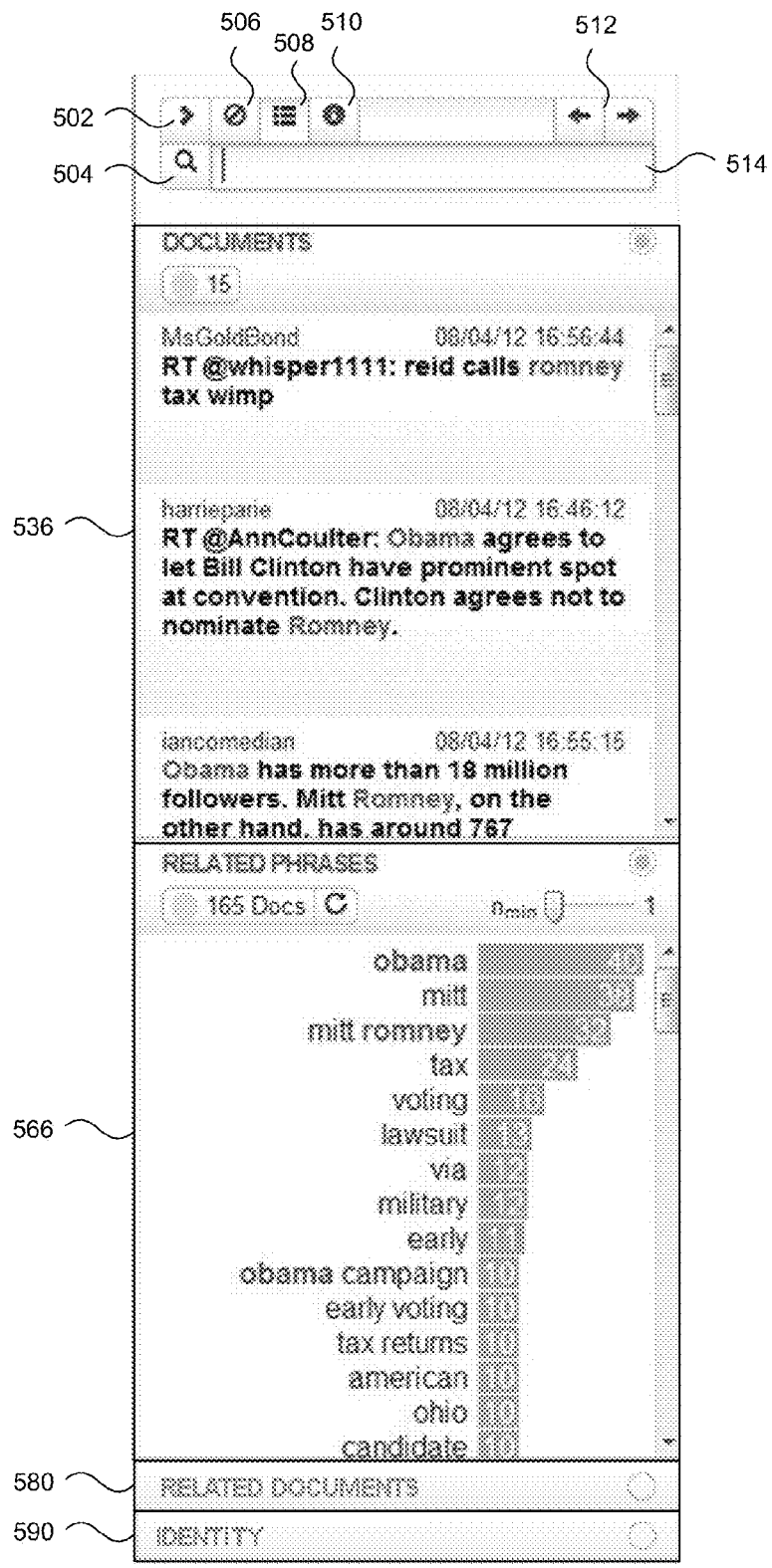
FIG. 5A is a user interface diagram illustrating the document inspector panel of a graphical user interface.

FIG. 5A is a user interface diagram illustrating the document inspector panel of a graphical user interface. The document inspector panel may include document inspector controls e.g., controls 502-512, and any number of inspector panels e.g., documents panel 536, related phrases panel 566, related documents panel 580, and identity panel 590. The inspector may include other inspector panels including, but not limited to, a trending phrases panel, a word count panel, a document count panel, and a topic groupings panel.

When a user selects a portion of the graphical representation in workspace panel 400, a server computing device may determine a subset of documents matching the selected portion of the graphical representation, called the selected documents. For example, the selected documents may match the query n-gram or n-grams for a selected graph, any filter n-grams applied for the graph, and an interval indicted by the selected portion. The server computing device may select portions of the selected documents for the various inspector panels. For example the selected documents for the documents panel 536 are called display documents and the selected documents for related phrases panel 566 are called related documents. Alternate set of documents may also be selected, or the same sets may be used, to populate other inspector panels, e.g., related documents panel 580, identity panel 590, or others. For the display documents, the server computing device may deliver a set of document snippets with corresponding links, and for the related documents the server computing device may deliver a set of related n-grams with corresponding occurrence statistics.

In some embodiments the inspector panel includes a trending phrases panel. The trending phrases panel displays a rate of change for n-grams or documents over the selected portion of the graphical representation. In some embodiments the inspector panel includes a word count panel. The work count panel displays a total count for n-grams within the related documents, without respect to their proximity to a query n-gram. In some embodiments the inspector panel includes a document count panel. The document count panel displays indications for how often documents occur matching the query and selected portion of the graphical representation. In some embodiments the inspector panel includes a topic groupings panel. The topic groupings panel displays an indication of topics identified in a set of documents defined by the selected portion of the graphical representation. Topics may be identified based on key words or phrases, document structure, pre-defined topic categories or identifiers calculated for the set of documents, a topic grammar, or other semantic analysis on the set of documents. In some embodiments the inspector panel includes a Documents panel, such as Documents panel 536, which is discussed in more detail below in reference to FIG. 5B. In some embodiments the inspector panel includes a Related Phrases panel, such as Related Phrases panel 566, which is discussed in more detail below in reference to FIG. 5C. In some embodiments the inspector panel includes a Related Documents panel, such as Related Documents panel 580, shown as toggled inactive. The Related Documents panel contains an indication of Documents that match a topic group corresponding to one or more of the query n-grams, for example the topics may identified with one of the topic groupings metrics. Similarly to the Documents panel, summaries are created for a subset of the documents matching the identified topics. The summaries may then be displayed as an actionable list. The Related Documents panel may be restricted to documents matching an interval defined by the selected portion of the graphical representation, or may include documents outside this range which match the identified topic. Identity panel 590, also shown as toggled inactive, may include a listing n-gram or document counts for subsets of related phrases. For example, if the subset of related phrases is defined as email addresses, the identity panel displays a list of email addresses with occurrence statistics either within a pre-defined distance of query n-grams or within a subset of documents defined by the selected portion of the graphical representation.

Figure 5B:
FIG. 5B is a user interface diagram illustrating the documents portion of the document inspector panel of a graphical user interface.

FIG. 5B is a user interface diagram illustrating the documents portion of the document inspector panel of a graphical user interface. The documents portion of the document inspector panel may include a list of snippets 538, and a document increase button 540. A snippet displayed in the list of snippets 538 may include a set of n-grams relating to the document. The snippets can include at least one n-gram from the query n-grams which was a basis for including the document in the set of selected documents. In some embodiments, the snippet is a set of words surrounding the basis n-gram. In another embodiment, the basis n-gram is indicated by highlighting it with a format or color different from the rest of the snippet. Other details regarding the underlying document may be included in the snippet e.g., publish time, an indicator of the author, length, an indictor for a string of related documents, or other document information. Snippet creation is discussed in more detail below in relation to FIG. 8B.

Document increase button 540 may be labeled with the number of documents in the display documents set. By engaging document increase button 540, a request to increase the set of display documents to a larger subset of the selected documents may be sent to the server computing device. The server computing device can send back the set of snippets for a larger set of display documents, which triggers updates of snippets list 538 and the number on the document increase button 540.

A user can select a snippet in the list of snippets 538, which activates the link provided with the snippet. In some embodiments the link opens a separate frame, window, or tab which includes the full text of the document related to the snippet. The user can also provide an indication that the document should be stored in a folder, which creates an association between the link and the folder in the library, discussed in more detail below in relation to FIG. 6.

The Documents panel can be hidden or displayed by selecting document toggle 542.

Figure 5C:
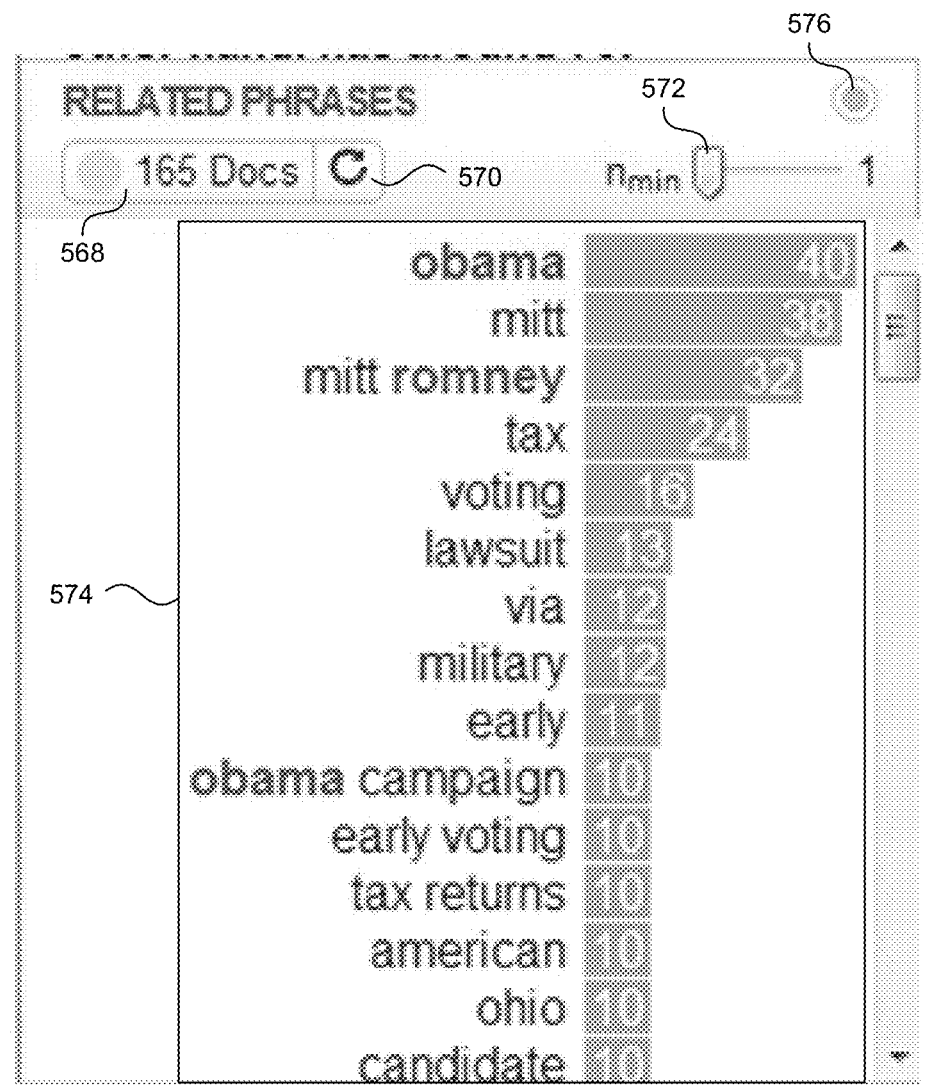
FIG. 5C is a user interface diagram illustrating the related phrases portion of the document inspector panel of a graphical user interface.

FIG. 5C is a user interface diagram illustrating the related phrases portion of the document inspector panel of a graphical user interface. Related phrases panel 566 illustrates increase related documents button 568, auto-load button 570, related nMin slider 572, and a list of related n-grams with corresponding occurrence indicators 574. Related n-grams are n-grams that appear in the same documents as the query n-grams within the related documents. In some embodiments, the corresponding occurrence indicator is a bar indicator with a value indicating the number of times the related n-gram exists within a pre-defined distance of a query n-gram. In other embodiments, the system sorts the related n-gram list by this occurrence value in the related documents from high to low. Related n-gram selection is discussed in more detail below in relation to FIG. 8B.

A user can select an n-gram in the list of related n-grams 574 to produce a menu which enables the user to add the n-gram to the query n-grams in a topic. This enables users to iteratively refine their searches as they selects interesting portions of the graphical representation, learn what n-grams coexist in that selected portion, and include one or more of those n-grams in their search to determine a previously unrealized relationship.

Also in the related n-grams menu, there may be an option to enable the user to view a list of snippets from the related documents or an option to inspect the selected n-gram by updating the document inspector panel based on the selected n-gram over the selected interval.

The related phrases panel can be hidden or displayed by selecting related phrases toggle 576.

FIG. 5A includes a number of controls 502-512 that operate on document panel 536 and related phrases panel 566. Each control in controls 502-512 may be placed in a variety of locations within the inspector panel, may have an expanded view, or may include a variety of related controls and input fields, such as input field 514.

Engaging close document inspector panel button 502 hides the document inspector until a user selects a new portion of the graphical representation.

Engaging search filter button 504 enables a user to enter a document filter n-gram. The display documents and related documents are then restricted to only include documents that include the document filter n-gram.

Similarly, engaging prune filter button 506 enables a user to enter a document prune n-gram. The display documents and related documents are then restricted to only include documents that do not include the document prune n-gram.

Engaging selection parameters button 508 displays parameters used to determine the selected documents. For example, the selection parameters may include the dataset, the query n-grams, a start and end value for an interval from the selected portion of the graphical representation, and the length of the interval. For selected portions of the graphical representation that include more than one n-gram, if the selection parameters include more than one n-gram, the user can toggle each n-gram between being optional or required. If an n-gram is toggled to required, only documents that include that n-gram will be included in the display documents and related documents.

Engaging measurements button 510 displays measurements related to the selected portion of the graphical representation. For example, the measurements could include values including the minimum, maximum, sum, and average of the selected portion.

Interval controls 512 can be engaged to select a new portion of the graphical representation with the same interval length as the current selected portion of the graphical representation. Engaging interval controls 512 can move the interval to the next or previous interval from the current selected portion of the graphical representation.

Figure 6:
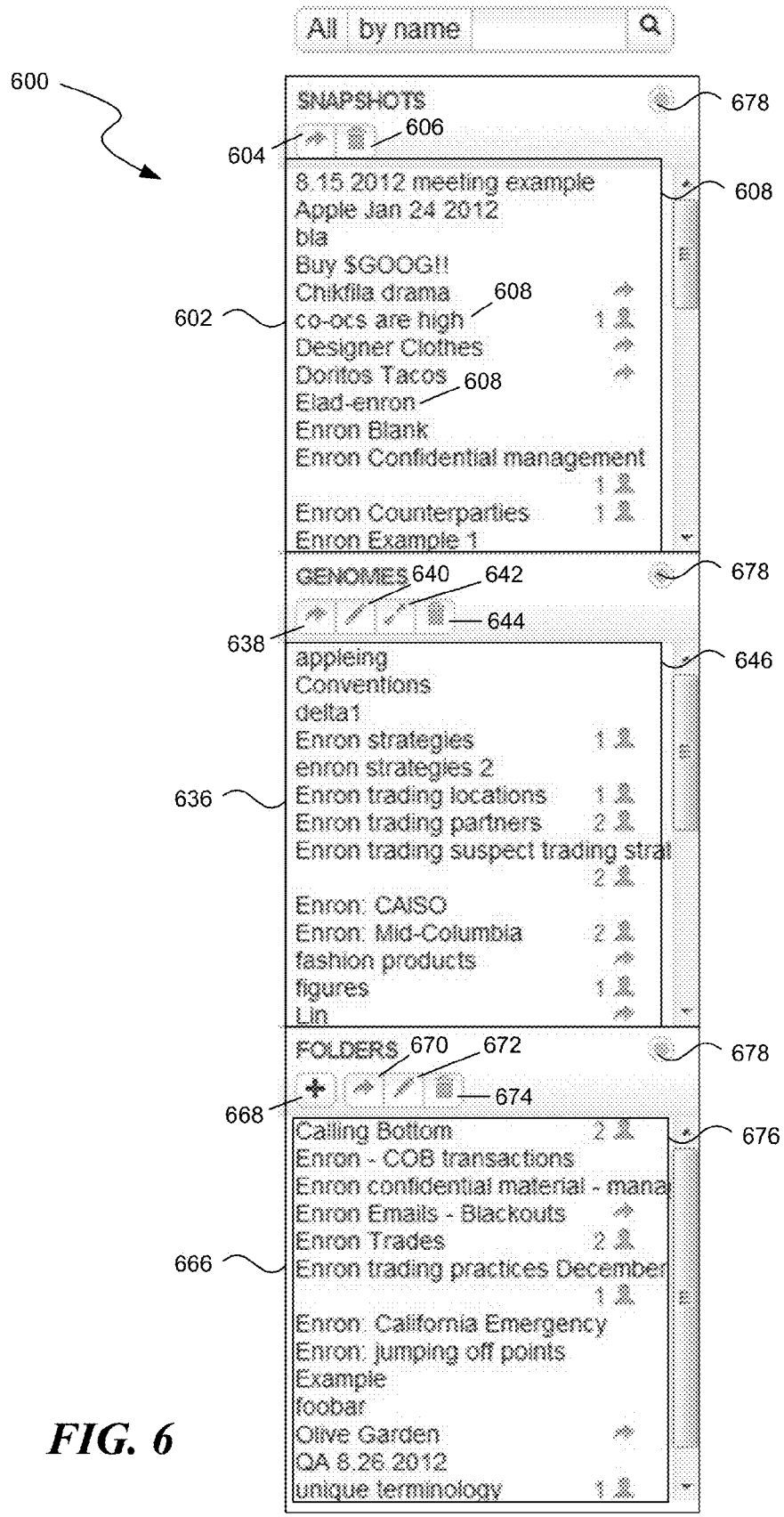
FIG. 6 is a user interface diagram illustrating the library panel of a graphical user interface.

FIG. 6 is a user interface diagram illustrating the library panel of a graphical user interface. The library panel enables a user to interact with snapshots, genomes and folders, collectively called library elements. The library panel has three sub-panels, the snapshots panel 602, the genomes panel 636, and the folders panel 666. Each of the sub-panels may be populated with library elements by sending a request to a server computing device 110, the request including an indication of the user, and receiving in response a set of library elements that user has access to. The sub-panels may be temporarily toggled between active and inactive, which minimizes the sub-panel, by engaging a panel toggle button 678.

The snapshots panel 602 has a list of snapshots 608. A user may save a snapshot to save the state of the query builder, workspace, and document inspector, effectively saving the current status of the system, which can be recalled by loading a saved state snapshot.

The genomes panel 636 has a list of genomes 646. The query n-grams from a topic from the query builder can be compressed into a genome by engaging the genome compact button in the topic controls. The genome may result in a single graph for the query n-grams in the genome, combined as a sum operation on the statistics returned for the n-grams in the query n-grams.

The folders panel 666 has a list of folders 676. Folders can contain documents added by a user.

The library sub-panels may have a number of controls enabling a user to interact with library elements. Snapshot share button 604, genome share button 638, and folders share button 670, enable users to share a library element with other users. Snapshot delete button 606, genome delete button 644, and folder delete button 674, enable users to delete a library element created by that user, or remove the library element from that users list of library elements if shared from another user.

Genome edit button 640 enables a user to add or remove n-grams from a selected genome in the list of genomes 646. Genome edit button 640 also enables a user to set a weight for individual n-grams within the genome. Setting a weight skews the weighted average of the genome n-grams according to the entered weights. Genome expand button 642 enables a user to create a new topic group with the query n-grams from the genome.

Folder edit button 672 displays an edit folder area, which enables a user to edit the name of a folder and browse the enclosed documents within a folder. The list of elements in the folder edit area can be displayed as a list of snippets from the documents. A button corresponding to each document snippet enables a user to remove a document from the folder. New folder button 668 enables a user to create a new folder in the list of folders 676.

An expand edit folder button in the edit folder area may expand the edit folder area to include a folder inspector panel which may include one or more sub-panels similar to the sub panels from the inspector panel. For example, the documents within the folder define a set of documents for inspection in a sub panel such as a related phrases panel, related documents panel, an identity panel, a trending phrases panel, a word count panel, a document count panel, or a topic groupings panel. The functionality of the folder inspector sub panels may also parallel the functionality of the inspector sub panels. For example, the most common n-grams in the related phrases folder inspector sub panel may be actionable with a context menu which allows a user to add them to a set of query n-grams.

Those skilled in the art will appreciate that the logic illustrated in FIGS. 1-6 described above, and in each of the flow diagrams discussed below, may be altered in a variety of ways. For example, the order of the logic may be rearranged, substeps may be performed in parallel, by the same or separate devices, functions, or libraries, illustrated logic may be omitted, other logic may be included, etc.

Figure 7A:
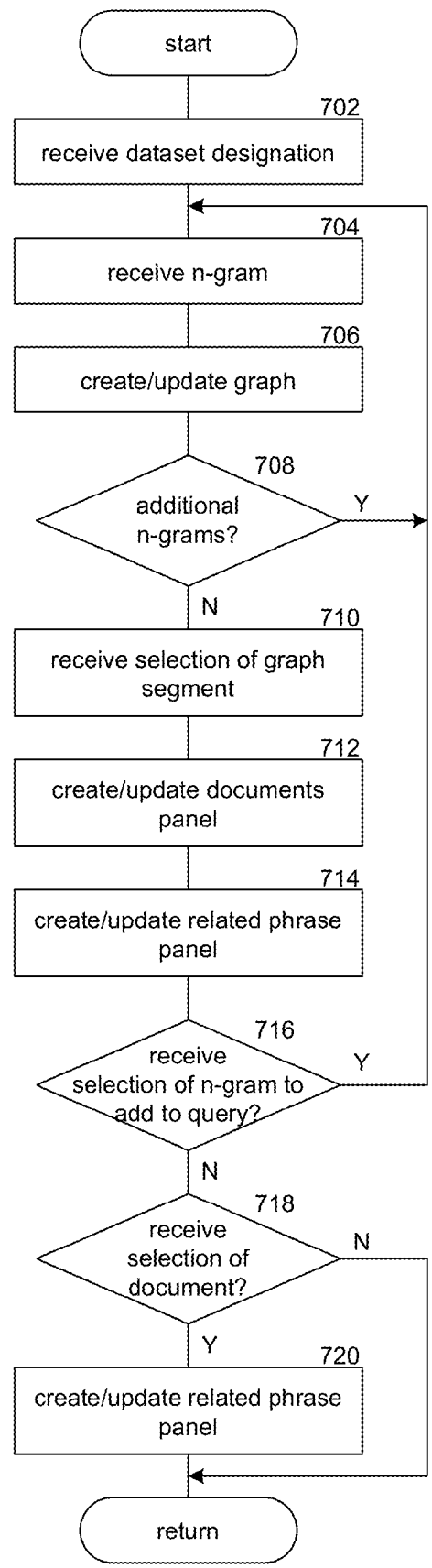
FIGS. 7A-C are flow diagrams illustrating the selection and display of n-gram statistics in a graphical user interface.
Figure 7B:
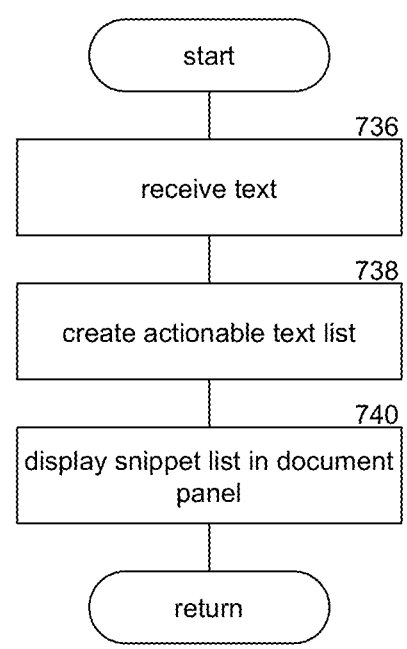
Figure 7C:
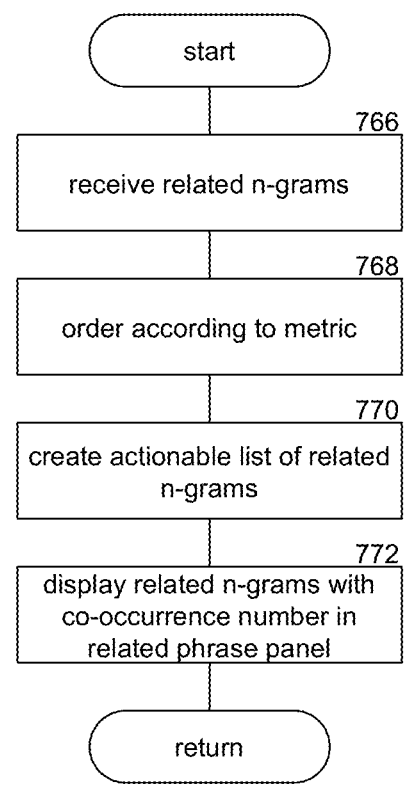

FIGS. 7A-C are flow diagrams illustrating the selection and display of n-gram statistics in a graphical user interface (GUI). The process begins at step 702, where the system can receive a designation of a dataset from a user. This designation may be received at a query builder panel of the GUI, or from a different input source. The system may then receive a designation of an n-gram at step 704, which it may add to a list of query n-grams for a current topic. The designation n-gram may come from a query builder panel of a GUI. The system may send the query n-grams to a server computing device, and in reply receive a set of statistics from the server computing device indicating occurrences of query n-grams within the dataset. At block 706, the system may build a graphical representation of the set of statistics including a set of graphs relating to grouping of n-grams. If the user enters additional n-grams at block 708 they may also be added to the query n-gram list at step 704. After the graphical representation is rendered, the user may select a portion of it at block 710. An indication of the selected portion of the graphical representation can be sent to a server computing device which may respond with a set of snippet/link pairs and a set of related n-gram/statistic pairs. At block 712 the system can create or update the documents list in the documents panel, discussed in more detail below in relation to FIG. 7B. At block 714 the system may create or update the related n-gram list in the related phrases panel, discussed in more detail below in relation to FIG. 7C.

At block 716, if the system receives a selection of one of the n-grams in the list of related n-grams, and a selection of a topic group, the system can add the n-gram to the query n-grams of the designated topic group at block 704. The server computing device may respond with a new set of statistics for the dataset and designated n-grams for that topic group. If the system does not receive a selection at block 716 it continues to block 718.

At block 718, if the user selects a document from the documents list the system continues to block 720 where it can open the link associated with the snippet to display the text of the document in a new area, for example a new window, tab, frame, or DIV element.

FIG. 7B is a flowchart illustrating further details on the process for creating or updating the documents panel, as in block 712 of FIG. 7A. At block 736, the system may receive, from a server computing device, a set of snippets with an associated link for each snippet. At block 738, the system may create a snippet list where each snippet in the snippet list may be joined with its associated link such that the snippet is actionable by a user. For example, a user may indicate a snippet by clicking it, rolling over it, or in some other way, and the system triggers display of the documents, as in block 720. At block 740 the system can display the list of snippets in the documents panel, replacing a previous list of snippets in the documents panel if this is not the user's first selected portion of the graphical representation. Each snippet in the snippet list may also accentuate the query n-gram which was the basis for including the snippet in the list of display documents.

FIG. 7C is a flowchart illustrating further details on the process for creating or updating the related phrases panel, as in block 714 of FIG. 7A. At block 766, the system may receive, from a server computing device, a set of n-grams from the set of related documents, each related n-gram associated with a value for its number of occurrences within a pre-defined distance of a query n-gram in the related documents. At block 768, the items displayed in the various inspector panels may be order according to different metrics, such as frequency, length, whether they are becoming more or less common, density within document areas or topics, and others. For example, the system can sort a set of related n-grams according to a the total number of occurrences, with the highest value first or last. At block 770, the system can create a related n-gram list.

Each n-gram in the related n-gram list may be joined with a link such that the n-gram is actionable by a user. For example, a user may indicate an n-gram by clicking on it or in some other way, and the system will provide a context menu with options. In some embodiments the options include "Add to Query," "Inspect," and "Excerpts." The add to query option may enable the user to add the n-gram to a topic group, as in block 718. The excerpts option may display a snippet list of documents containing the related n-gram. The inspect option may replace the query n-gram with the selected n-gram and update the document inspector, using the same interval. At block 772 the system can display the list of related n-grams in the related phrases panel, replacing a previous list of related n-grams if this is not the user's first selected portion of the graphical representation. If one of the query n-grams is a sub-element of a related n-gram, the system may accentuate the query n-gram in the list of related n-grams.

Figure 8A:
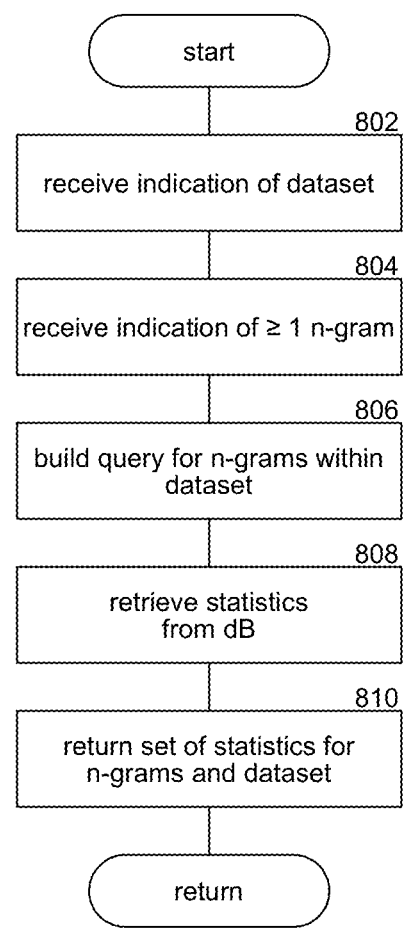
FIGS. 8A-B are flow diagrams illustrating server computing device responses to selections at a client computing device.

FIG. 8A is a flow diagram illustrating server computing device responses to query selections from a client computing device. At block 802 the server computing device may receive an indication of a dataset. At block 804 the server computing device may receive an indication of one or more n-grams. The server computing device then, at block 806, can build a query for the received n-grams within the dataset. In some embodiments, the server computing device may also have received an indication of an interval or a scale. The query can be optimized to search only within the specified interval, or to search aggregates for points at scale units.

At block 808, the query may be run on a database to retrieve statistics. In some embodiments, the database is a non-relational database such as HBase or Google's™ BigTable™. Database creation, population, and operation is discussed in more detail below in relation to FIG. 11.

At block 810 the server computing device may return statistics regarding the query n-grams. The statistics may be limited to a particular interval, may be periodic according to a particular scale, or may include all the statistics for the query n-grams in the indicated dataset.

Figure 8B:
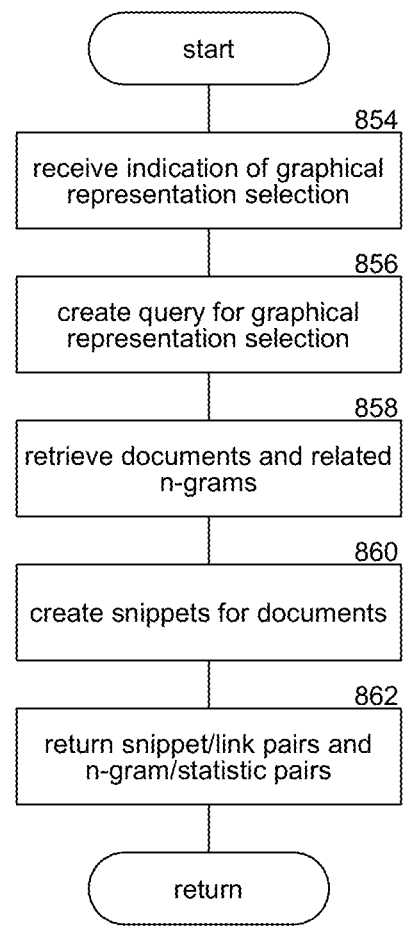

FIG. 8B is a flow diagram illustrating server computing device responses to an indication of a selection of a graphical representation from a client computing device. An indication of a selected portion of a graphical representation may be received by the server computing device at block 854. At block 856, the server computing device may create a query to retrieve documents that match both the query n-grams and interval indicted by the selected portion of the graphical representation. For instance, the indication may include a designation of a particular length of a specific graph or set of query n-grams and a dataset. The query may then look within the table matching the dataset for documents with a timestamp within the interval and that contain the query n-gram(s).

At block 858, the query may be run against a database to retrieve the text of matching documents, a link to that document, and a set of related n-grams that occur within a pre-defined distance of a query n-gram, with corresponding occurrence statistics. The server computing device may also receive an indication of a number of documents to search. The query may limit search results to the document limit, or may prune results after retrieving all matching results.

At block 860, the server computing device can create a snippet for each of the resulting documents. Each of the snippets may be a summary or excerpt from the data subset. In some embodiments the server computing device creates snippets by extracting a predefined number of words before and after the first occurrence of a query n-gram. Each snippet also may be associated with the link to a location containing the full text of the document.

At block 862, the server computing device may return a set of snippet/link pairs and a set of related n-gram/statistic pairs matching the indication of the selected portion of the graphical representation.

Figure 9:
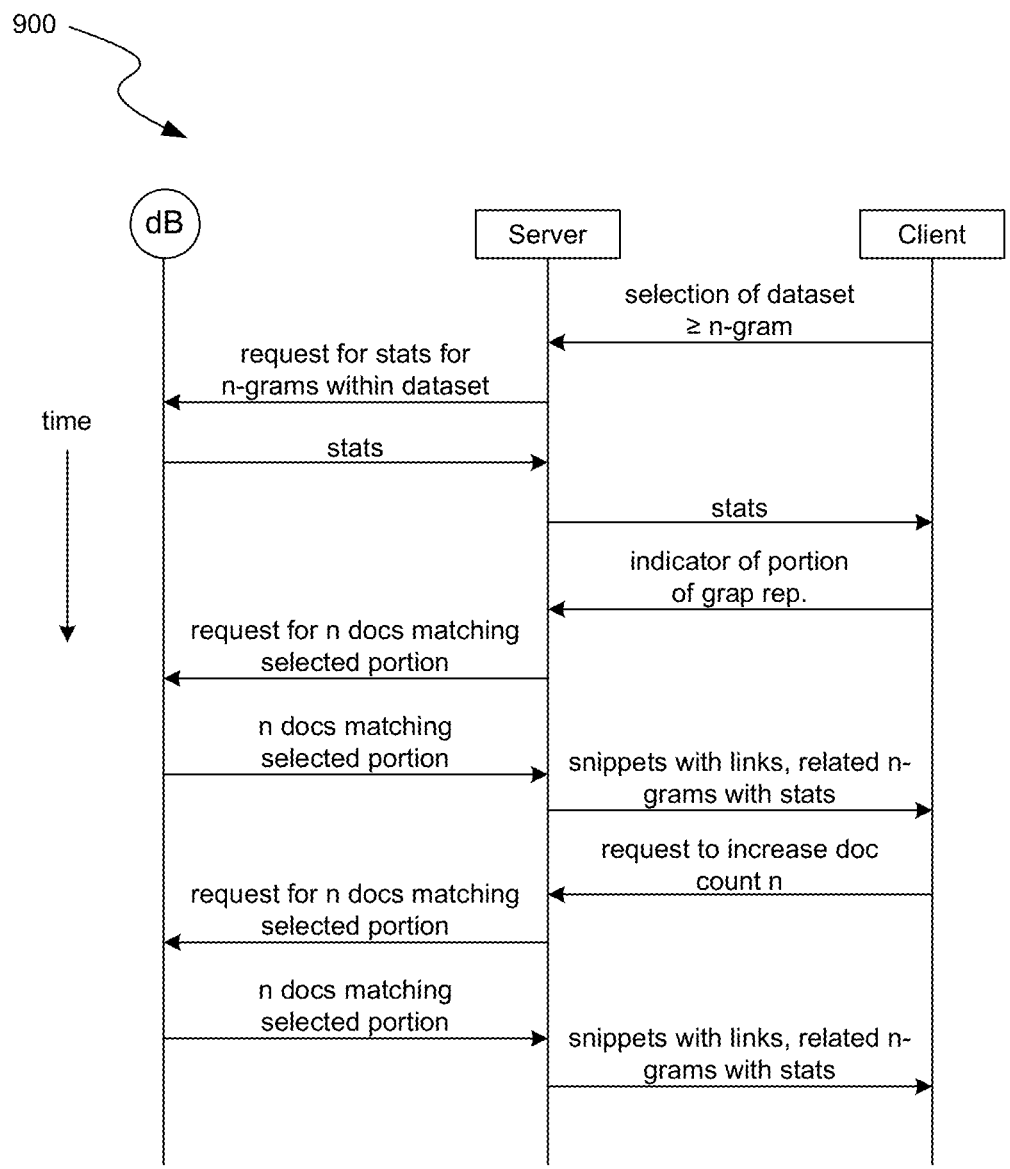
FIG. 9 is a communications diagram illustrating communication between a client, server, and database computing devices.

FIG. 9 is a communications diagram illustrating communication between a client, server, and database computing devices corresponding to the processes described in relation to FIGS. 7A-8B.

Figure 10:
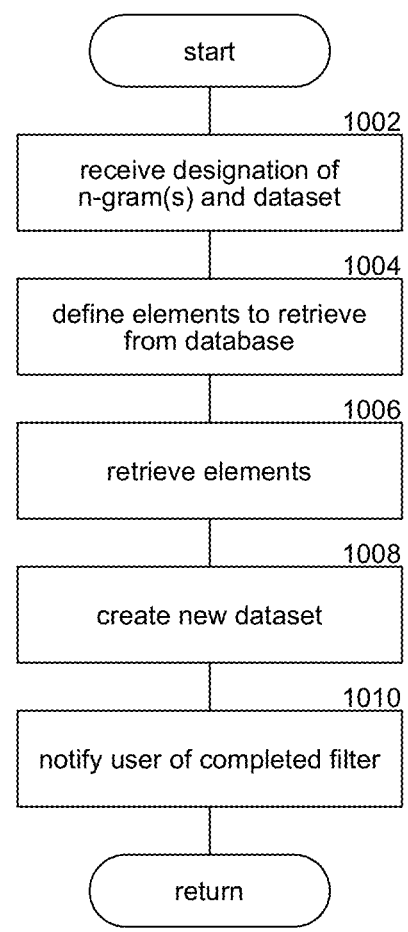
FIG. 10 is a flow diagram illustrating the creation of a filter at a server computing device.

FIG. 10 is a flow diagram illustrating the creation of a co-occurrence filter at a server computing device. A co-occurrence filter may limit a dataset to only include documents which include the filter n-gram, effectively creating a new dataset which is a subset of the designated dataset. The process begins at block 1002 by receiving one or more filter n-grams and a dataset. The server computing device at block 1004 may then construct a query, launch a computational batch job, or otherwise define a set of parameters to find documents within the dataset containing the filter n-grams. In some embodiments the parameters are built to find all documents that match any of the filter n-grams. In other embodiments, the parameters may be built to find only documents that contain all the filter n-grams. The server computing device then execute instructions with the defined parameters against the designated dataset at block 1006 to determine the restricted dataset.

At block 1008, the server computing device can create a new dataset in the database for the filter. This is may be accomplished by recalculating the word count and document count for each n-gram in the restricted dataset, adding raw document entries for the filter set to a filter table or appending entries to a raw table, updating or creating new aggregates (aggregates are discussed below in relation to FIG. 11), creating a new table, or appending items to an existing table with a set of columns and primary index identical to the table corresponding to the full dataset. The server computing device at block 1010 may notify the client computing device that filter creation is complete.

While the previous example discussed the creation of a new table in a non-relational database. Persons skilled in the art will understand that the same process could be accomplished in a number of other ways, e.g., appending entries to a the original dataset table in a non-relational database, by creating a linking table or new identifier column in a relational database, or by modifying the query to only find elements matching the filter n-grams.

Figure 11:
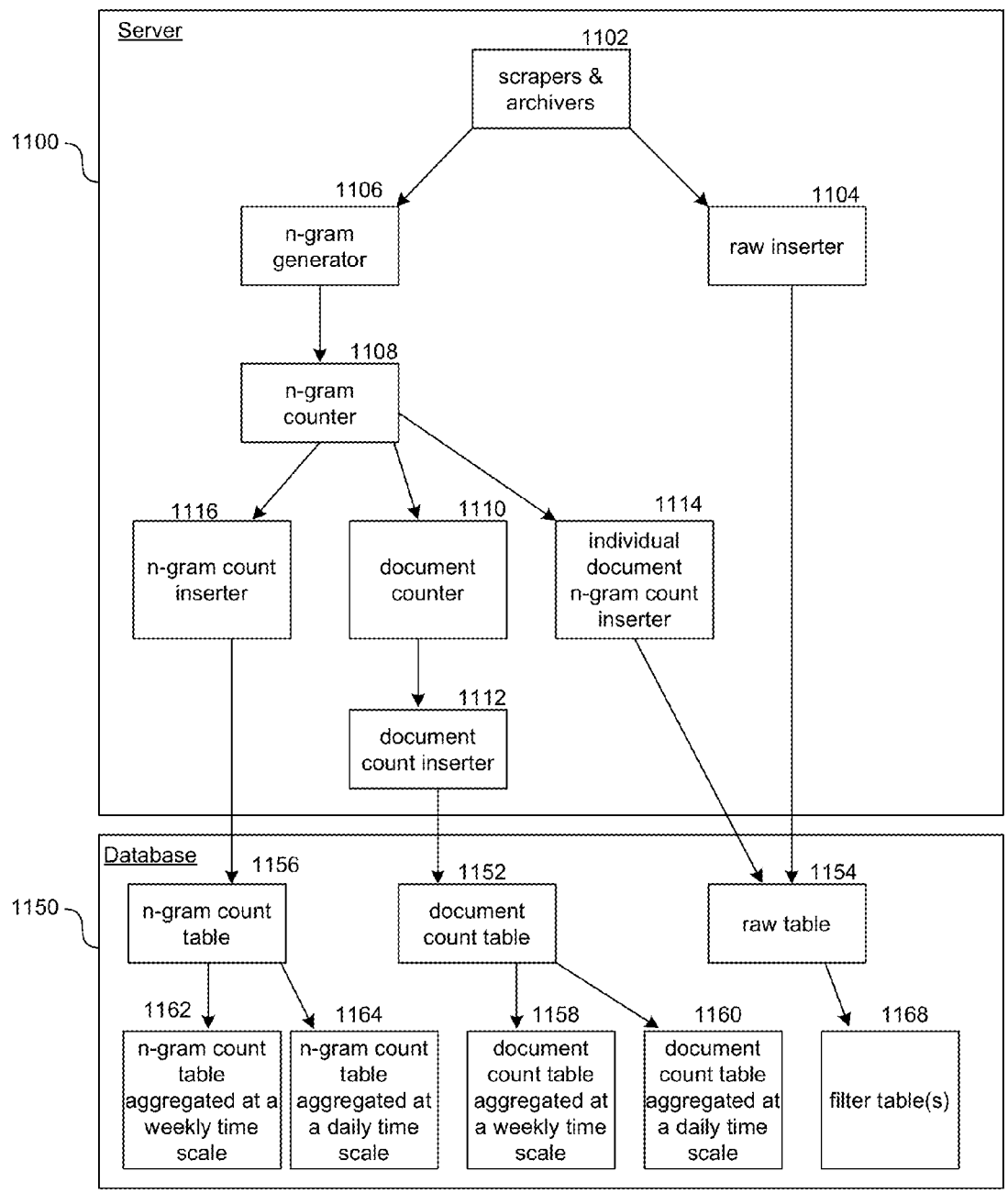
FIG. 11 is a server/database component diagram illustrating a possible relationship between and among server applications and database tables.

FIG. 11 is a server/database component diagram illustrating a possible relationship between and among server applications and database tables in an HBase database implementation. Area 1100 illustrates data converters and inserters operating at a server computing device. Area 1150 represents HBase tables.

A server computing device may receive raw information from scrapers and archivers 1102. Data sources may include any number of sources, including but not limited to, websites for example TWITTER™ or other blog spaces, news feeds, email sets, statistical databases, etc. These data sources may require an importer to add meta data or pull individual fields from the retrieved data. Scrapers and archivers 1102 may pass the raw information to raw inserter 1104 and n-gram generator 1106.

Raw inserter 1104 can insert the raw data into raw table 1154. This table may be used, for example, to find documents to create snippets and to provide the full text of documents by links associated with snippets. When a co-occurrence filter is created, as discussed above, a subset of the raw table may be duplicated in filter table 1168.

N-gram generator 1106 may determine a set of n-grams for each document in the raw data. In some embodiments n-gram generation occurs by converting all characters to lower case, creating breaks at certain punctuation marks e.g., periods and commas, and splitting the documents into each possible word and set of words. In other embodiments, users are able to specify rules, such as a grammar, to define how n-gram generator 1106 parses documents into individual n-grams. N-gram creating is well known by persons skilled in the art, and is accomplished by applications such as the Natural Language Tool Kit (NLTK) tokenizer.

N-gram generator 1106 can pass the n-grams and documents to n-gram counter 1108. N-gram counter 1108 can count the total occurrences of each n-gram in the dataset and a count of the number of occurrences of each n-gram within each document. The n-grams and documents may be passed to document counter 1110, the counts of the number of occurrences of each n-gram within each document may be passed to individual document n-gram count inserter 1114, and the total n-gram counts within the dataset may be passed to n-gram count inserter 1116.

Document counter 1110 can count the number of documents in which each n-gram occurs. This count may be passed to document count inserter 1112. Document count inserter 1112 can insert the documents into document count table 1152. In some embodiments the primary index is a time step. In other embodiments the primary index is the n-gram.

In some embodiments, after receiving a designation of a dataset and query n-grams, the server computing device may return statistics from document count table 1152 regarding the number of documents containing the n-gram, instead of the total number of occurrences. Also, if the graphical representation is set to display as a frequency, the number of documents containing each n-gram may be used to divide the total count for each point to retrieve the frequency statistics.

Individual document word count inserter 1114 may receive the n-gram counts per document and can insert them into raw table 1154 corresponding to individual documents. N-gram count inserter 1116 can insert the total n-gram counts into n-gram count table 1156. When a server computing device receives a request for statistics with designation of a dataset and query n-grams, or when the server computing device is determining a count for related n-grams within a particular document set, it may retrieve statistics from the n-gram count table and raw table.

Document count table 1152, and n-gram count table 1156 are used to create aggregate tables 1158-1164. Aggregates can improve the performance of database queries by encapsulating datablocks into a granularity commensurate with a search. For example, if a graph is to be drawn on a scale of weeks, querying every data element for every microsecond of the interval, and then compressing it into the correct granularity can take a significant amount of time. Instead, pulling the values from an aggregate table compressed to an hourly or daily scale will provide sufficient detail without the need to query and return a massive number of entries. Aggregation is a technique for processing such operations so users can quickly retrieve abstractions of large sets of data. Document count table 1152 may be compressed into an aggregate 1158 at a weekly time scale and an aggregate 1160 daily time scale. N-gram count table 1156 may also be compressed into an aggregate 1162 at a weekly time scale and an aggregate 1164 daily time scale. These aggregates may be separate tables, or entries appended onto the existing document count 1152 and n-gram count 1156 tables. The aggregate tables may also include separate entries calculated for co-occurrence n-grams.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A computer-implemented method for visually finding N-grams in near-time, comprising:
in response to a user request, generating digital information processable by a client device to display a GUI, wherein the GUI includes a first element for receiving user input specifying one or more query terms, a second element for receiving a user selection specifying a dataset, a third element for displaying a velocity graph, and a fourth element for displaying a list of candidate n-grams;
transmitting the digital information for generating the GUI to the client device;
in response to receiving, from the client device, a user input specifying a particular one or more query terms and a user selection specifying a particular dataset:
searching for and retrieving from the dataset, documents that include the one or more query terms;
detecting candidate n-grams of the particular one or more query terms, wherein the detecting includes applying programmatic heuristics based on co-occurrence with the particular one or more query terms in the retrieved documents;
selecting one or more of the candidate n-grams, wherein the selecting is based on co-occurrence statistics; and
generating information processable by the client device to display, in the third element, a velocity graph that displays the number of retrieved documents as a function of time and, in the fourth element, a list of the selected candidate n-grams of the particular one or more query terms; and
transmitting, to the client device, the digital information for displaying the velocity graph and the candidate n-grams.

2. The computer-implemented method of claim 1, further comprising:
in response to receiving, from the client device, a user input specifying a user selected set of candidate n-grams from the selected candidate n-grams:
searching for and retrieving from the dataset, a second set of documents that include the user selected set of candidate n-grams;
generating information processable by the client device to display, in the third element, an updated velocity graph that displays the number of retrieved documents that include the user selected set of candidate n-grams as a function of time; and
transmitting, to the client device, the digital information for displaying the updated velocity graph.

3. The computer-implemented method of claim 2, wherein:
the searching for the second set of documents further includes searching the dataset for documents that include the particular one or more query terms in addition to the user selected set of candidate n-grams; and
the generating further includes generating information processable by the client device to display the updated velocity graph that displays the number of retrieved documents that include the particular one or more query terms and the user selected set of candidate n-grams.

4. The computer-implemented method of claim 1, further comprising:
in response to receiving, from the client device, a user input representing a selection of a portion of the velocity graph corresponding to a refined time range that corresponds to a spike:
searching for and retrieving from the dataset, a second set of documents within the refined time range that include the particular one or more query terms;
detecting a second set of candidate n-grams of the particular one or more query terms, wherein the detecting includes applying programmatic heuristics based on co-occurrence with the particular one or more query terms in the second set of retrieved documents;
generating information processable by the client device to display, in the third element, an updated velocity graph that displays the number of retrieved documents from the second set of documents as a function of time over the refined time range and, in the fourth element, an updated list including the second set of candidate n-grams; and
transmitting, to the client device, the digital information for displaying the updated velocity graph and the updated list.

5. The computer-implemented method of claim 1, wherein the detecting candidate n-grams is limited to candidate n-grams within a predefined distance from the particular one or more query terms.

6. The computer-implemented method of claim 1, further comprising computing co-occurrence statistics for each of the candidate n-grams, wherein the co-occurrence statistics comprise at least one selected from a group consisting of a frequency of each candidate n-gram in a set of documents, a length of each candidate n-gram, whether each candidate n-gram is becoming more or less common in a set of documents, an occurrence density of each candidate n-gram within document areas or topics, and a total number of occurrences of each candidate n-gram.

7. The computer-implemented method of claim 1, wherein the user input specifying the particular one or more query terms includes a mathematical or logical operation applicable on the particular one or more query terms to at least partially define the searching of the dataset.

8. The computer-implemented method of claim 1, wherein the documents are Tweets.

9. A system for visually finding N-grams in near-time, comprising:
a computer processor; and
memory comprising modules configured to execute on the computer processor to enable the computer processor to:
in response to a user request, generate digital information processable by a client device to display a GUI, wherein the GUI includes a first element for receiving user input specifying one or more query terms, a second element for receiving a user selection specifying a dataset, a third element for displaying a velocity graph, and a fourth element for displaying a list of candidate n-grams;
transmit the digital information for generating the GUI to the client device;
in response to receiving, from the client device, a user input specifying a particular one or more query terms and a user selection specifying a particular dataset:
search for and retrieve from the dataset, documents that include the one or more query terms;
detect candidate n-grams of the particular one or more query terms, wherein the detecting includes applying programmatic heuristics based on co-occurrence with the particular one or more query terms in the retrieved documents;

select one or more of the candidate n-grams, wherein the selecting is based on co-occurrence statistics; and generate information processable by the client device to display, in the third element, a velocity graph that displays the number of retrieved documents as a function of time and, in the fourth element, a list of the selected candidate n-grams of the particular one or more query terms; and transmit, to the client device, the digital information for displaying the velocity graph and the candidate n-grams.

10. The system of claim 9, wherein the module is further configured to enable the computer processor to:

in response to receiving, from the client device, a user input specifying a user selected set of candidate n-grams from the selected candidate n-grams:

search for and retrieve from the dataset, a second set of documents that include the user selected set of candidate n-grams;

generate information processable by the client device to display, in the third element, an updated velocity graph that displays the number of retrieved documents that include the user selected set of candidate n-grams as a function of time; and transmit, to the client device, the digital information for displaying the updated velocity graph.

11. The system of claim 10, wherein:

the searching for the second set of documents further includes searching the dataset for documents that include the particular one or more query terms in addition to the user selected set of candidate n-grams; and the generating further includes generating information processable by the client device to display the updated velocity graph that displays the number of retrieved documents that include the particular one or more query terms and the user selected set of candidate n-grams.

12. The system of claim 9, wherein the module is further configured to enable the computer processor to:

in response to receiving, from the client device, a user input representing a selection of a portion of the velocity graph corresponding to a refined time range that corresponds to a spike:

search for and retrieve from the dataset, a second set of documents within the refined time range that include the particular one or more query terms;

detect a second set of candidate n-grams of the particular one or more query terms, wherein the detecting includes applying programmatic heuristics based on co-occurrence with the particular one or more query terms in the second set of retrieved documents;

generate information processable by the client device to display, in the third element, an updated velocity graph that displays the number of retrieved documents from the second set of documents as a function of time over the refined time range and, in the fourth element, an updated list including the second set of candidate n-grams; and transmit, to the client device, the digital information for displaying the updated velocity graph and the updated list.

13. The system of claim 9, wherein the detecting candidate n-grams is limited to candidate n-grams within a predefined distance from the particular one or more query terms.

14. The system of claim 9, wherein the module is further configured to enable the computer processor to:

compute co-occurrence statistics for each of the candidate n-grams, wherein the co-occurrence statistics comprise at least one selected from a group consisting of a frequency of each candidate n-gram in a set of documents, a length of each candidate n-gram, whether each candidate n-gram is becoming more or less common in a set of documents, an occurrence density of each candidate n-gram within document areas or topics, and a total number of occurrences of each candidate n-gram.

15. The system of claim 9, wherein the user input specifying the particular one or more query terms includes a mathematical or logical operation applicable on the particular one or more query terms to at least partially define the searching of the dataset.

16. The system of claim 9, wherein the documents are Tweets.

17. A non-transitory computer-readable storage medium comprising a plurality of instructions for visually finding N-grams in near-time, the plurality of instructions configured to execute on at least one computer processor to enable the at least one computer processor to:

in response to a user request, generate digital information processable by a client device to display a GUI, wherein the GUI includes a first element for receiving user input specifying one or more query terms, a second element for receiving a user selection specifying a dataset, a third element for displaying a velocity graph, and a fourth element for displaying a list of candidate n-grams;

transmit the digital information for generating the GUI to the client device;

in response to receiving, from the client device, a user input specifying a particular one or more query terms and a user selection specifying a particular dataset:

search for and retrieve from the dataset, documents that include the one or more query terms;

detect candidate n-grams of the particular one or more query terms, wherein the detecting includes applying programmatic heuristics based on co-occurrence with the particular one or more query terms in the retrieved documents;

select one or more of the candidate n-grams, wherein the selecting is based on co-occurrence statistics; and generate information processable by the client device to display, in the third element, a velocity graph that displays the number of retrieved documents as a function of time and, in the fourth element, a list of the selected candidate n-grams of the particular one or more query terms; and transmit, to the client device, the digital information for displaying the velocity graph and the candidate n-grams.

18. The non-transitory computer-readable storage medium of claim 17, wherein the plurality of instructions are configured to execute on the at least one computer processor to enable the at least one computer processor to:

in response to receiving, from the client device, a user input specifying a user selected set of candidate n-grams from the selected candidate n-grams:

search for and retrieve from the dataset, a second set of documents that include the user selected set of candidate n-grams;

generate information processable by the client device to display, in the third element, an updated velocity graph that displays the number of retrieved documents that include the user selected set of candidate n-grams as a function of time; and transmit, to the client device, the digital information for displaying the updated velocity graph.

19. The non-transitory computer-readable storage medium of claim 18, wherein:

the searching for the second set of documents further includes searching the dataset for documents that include the particular one or more query terms in addition to the user selected set of candidate n-grams; and the generating further includes generating information processable by the client device to display the updated velocity graph that displays the number of retrieved documents that include the particular one or more query terms and the user selected set of candidate n-grams.

20. The non-transitory computer-readable storage medium of claim 17, wherein the plurality of instructions are configured to execute on the at least one computer processor to enable the at least one computer processor to:

in response to receiving, from the client device, a user input representing a selection of a portion of the velocity graph corresponding to a refined time range that corresponds to a spike:

search for and retrieve from the dataset, a second set of documents within the refined time range that include the particular one or more query terms;

detect a second set of candidate n-grams of the particular one or more query terms, wherein the detecting includes applying programmatic heuristics based on co-occurrence with the particular one or more query terms in the second set of retrieved documents;

generate information processable by the client device to display, in the third element, an updated velocity graph that displays the number of retrieved documents from the second set of documents as a function of time over the refined time range and, in the fourth element, an updated list including the second set of candidate n-grams; and transmit, to the client device, the digital information for displaying the updated velocity graph and the updated list.

* * * * *